US012374253B2

(12) United States Patent
Pan et al.

(10) Patent No.: US 12,374,253 B2
(45) Date of Patent: Jul. 29, 2025

(54) DISPLAY PANEL AND DISPLAY DEVICE

(71) Applicant: Xiamen Tianma Display Technology Co., Ltd., Xiamen (CN)

(72) Inventors: Jiemiao Pan, Xiamen (CN); Yuheng Zhang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/380,437

(22) Filed: Oct. 16, 2023

(65) Prior Publication Data

US 2024/0046832 A1 Feb. 8, 2024

(30) Foreign Application Priority Data

Jul. 3, 2023 (CN) ......................... 202310806881.5

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01); *G09G 2310/08* (2013.01); *G09G 2320/0233* (2013.01); *G09G 2320/045* (2013.01); *G09G 2320/0626* (2013.01); *G09G 2330/021* (2013.01)

(58) Field of Classification Search
CPC ............. G09G 3/20; G09G 2300/0819; G09G 2300/0842; G09G 2310/08; G09G 2320/0233; G09G 2320/045; G09G 2320/0626; G09G 2330/021
See application file for complete search history.

(56) References Cited

U.S. PATENT DOCUMENTS

2022/0180812 A1* 6/2022 Lin ...................... G09G 3/3258
2024/0177667 A1* 5/2024 Zhang .................. G09G 3/3233
2024/0212576 A1* 6/2024 Lee ...................... G09G 3/2096

* cited by examiner

*Primary Examiner* — Lixi C Simpson
(74) *Attorney, Agent, or Firm* — KDW FIRM PLLC

(57) ABSTRACT

Provided are a display panel and a display device. The display panel includes a pixel circuit and a light-emitting element. In a data writing phase, a data writing module of the pixel circuit provides a data signal. In an initialization writing phase, an initialization module of the pixel circuit provides an initialization signal. In the same data writing frame, a time period between the start time of the initialization writing phase and the start time of the data writing phase is an initialization phase. The duration of the initialization phase in a first mode is different from the duration of the initialization phase in a second mode, and/or the duration of the initialization writing phase in a first mode is different from the duration of the initialization writing phase in a second mode.

20 Claims, 20 Drawing Sheets

DISPLAY PANEL AND DISPLAY DEVICE

CROSS-REFERENCE TO RELATED APPLICATIONS

This application claims priority to Chinese patent application No. 202310806881.5 filed with the China National Intellectual Property Administration (CNIPA) on Jul. 3, 2023, the disclosure of which is incorporated herein by reference in its entirety.

TECHNICAL FIELD

The present disclosure relates to the technical field of display panels, in particular, a display panel and a display device.

BACKGROUND

A pixel circuit and a light-emitting element are generally disposed in a display panel. A drive transistor in the pixel circuit is capable of providing a drive current to the light-emitting element according to a received data signal to drive the light-emitting element to emit light so that the display panel presents a corresponding display screen.

However, with the passage of time, internal characteristics of the drive transistor in the pixel circuit change slowly, causing threshold voltage shifting of the drive transistor. Moreover, the threshold shifting of the drive transistor is different at different display brightness, affecting the display uniformity of the display panel.

SUMMARY

The present disclosure provides a display panel and a display device for initializing the drive transistor to different degrees in different brightness modes, thereby improving the display uniformity of the display panel in different brightness modes.

According to the present disclosure, a display panel is provided. The display panel includes a pixel circuit and a light-emitting element.

The pixel circuit includes a drive module, an initialization module, and a data writing module. The drive module includes a drive transistor.

The drive module is configured to selectively provide a drive current to the light-emitting element.

The operation process of the pixel circuit includes a data writing phase and an initialization writing phase. In the data writing phase, the data writing module provides a data signal; and in the initialization writing phase, the initialization module provides an initialization signal.

The time of one screen frame of the display panel includes at least a data writing frame. The data writing frame includes the initialization writing phase, the data writing phase, and a light-emitting phase.

In the same data writing frame, a time period between the start time of the initialization writing phase and the start time of the data writing phase is an initialization phase.

The display mode of the display panel includes a first mode and a second mode. The display brightness of the display panel in the first mode is different from the display brightness of the display panel in the second mode.

The duration of the initialization phase in the first mode is different from the duration of the initialization phase in the second mode, and/or the duration of the initialization writing phase in the first mode is different from the duration of the initialization writing phase in the second mode.

An embodiment of the present disclosure provides a display device including the display panel described above.

It is to be understood that the contents described in this part are not intended to identify key or important features of embodiments of the present disclosure and are not intended to limit the scope of the present disclosure. Other features of the present disclosure are apparent from the description provided hereinafter.

BRIEF DESCRIPTION OF DRAWINGS

To illustrate technical schemes in embodiments of the present disclosure more clearly, accompanying drawings used in the description of the embodiments are briefly described below. Apparently, the accompanying drawings described below illustrate part of embodiments of the present disclosure, and those of ordinary skill in the art may acquire other accompanying drawings based on the accompanying drawings described below on the premise that no creative work is done.

DETAILED DESCRIPTION

Figure 1:
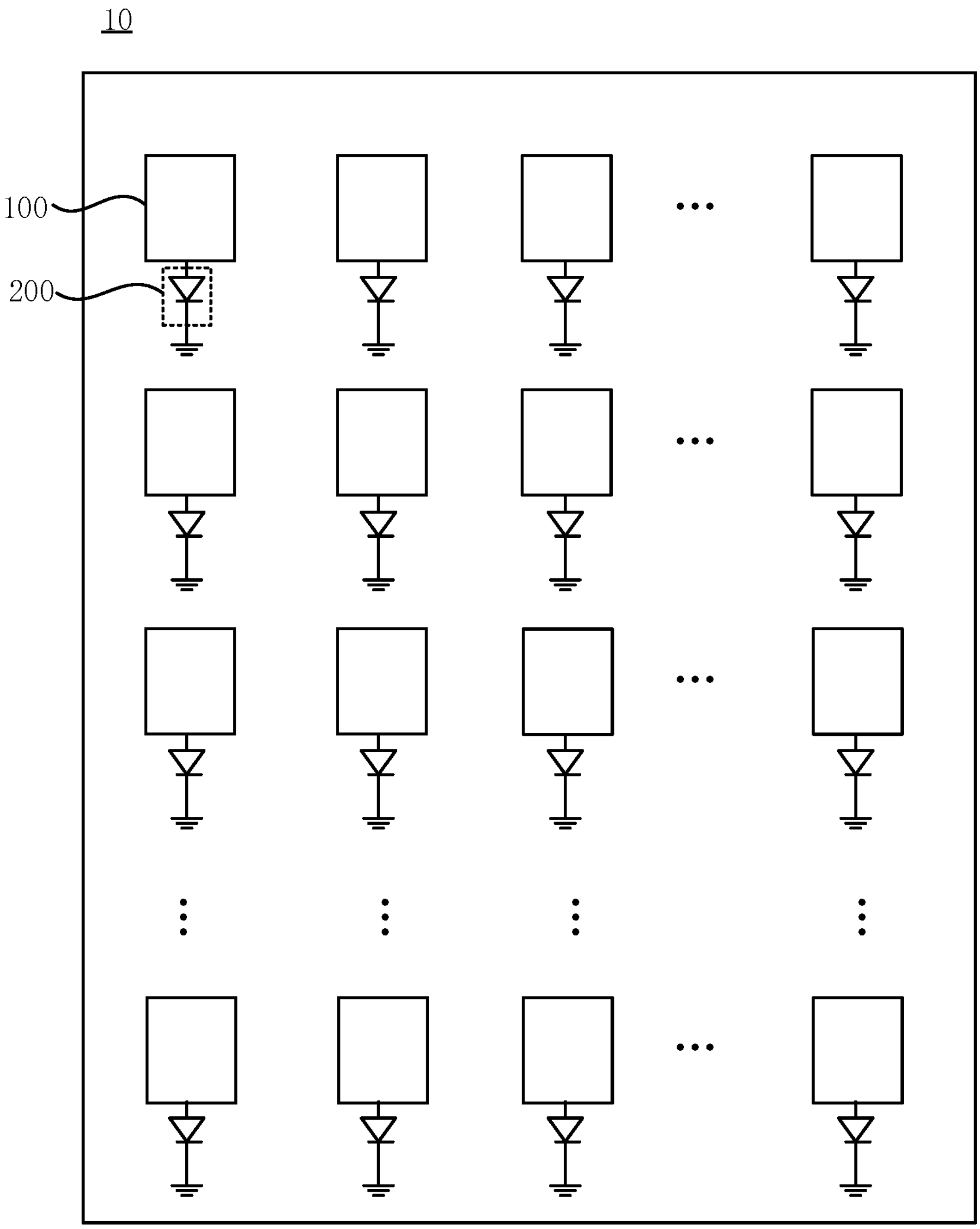
FIG. 1 is a diagram illustrating the structure of a display panel according to an embodiment of the present disclosure.

The schemes in embodiments of the present disclosure are described clearly and completely in conjunction with drawings in the embodiments of the present disclosure from which the schemes are better understood by those skilled in the art. Apparently, the embodiments described below are part, not all, of the embodiments of the present disclosure. Based on the embodiments described herein, all other embodiments acquired by those skilled in the art on the premise that no creative work is done are within the scope of the present disclosure.

It is to be noted that terms such as "first" and "second" in the description, claims, and drawings of the present disclosure are used to distinguish between similar objects and are not necessarily used to describe a particular order or sequence. It should be understood that the data used in this manner are interchangeable where appropriate so that the embodiments of the present disclosure described herein may also be implemented in a sequence not illustrated or described herein. In addition, terms "comprise", "include", and any other variations thereof are intended to encompass a non-exclusive inclusion. For example, a system, product, or device that includes a series of units not only includes the expressly listed steps or units, but may also include other steps that are not expressly listed or are inherent to such a product or device.

A self-emitting display panel includes a pixel circuit and a light-emitting element. The pixel circuit includes a drive transistor. A data signal is provided to the gate of the drive transistor so that the drive transistor converts the data signal into a drive current to drive the light-emitting element to emit light. However, when the drive transistor is turned on, the voltage of the gate may be higher than the voltage of the drain for a P-channel metal oxide semiconductor (PMOS) transistor; and the voltage of the gate may be lower than the voltage of the drain for an N-channel metal oxide semiconductor (NMOS) transistor. If this state is kept for a long time, ions inside the drive transistor are polarized so that internal built-in electric field is formed inside the drive transistor, causing continuous threshold voltage shifting of the drive transistor, making the drive transistor biased, and thus affecting the stability of the drive current provided by the drive transistor. In this manner, the light-emitting stability of the light-emitting element is affected.

In addition, when the display panel presents different display brightness, the data signal provided for the drive transistor may be different. Alternatively, the light-emitting time of the light-emitting element may be different, resulting in different bias of the drive transistor, that is, the threshold voltage shifting of the drive transistor may be different. In this manner, the display uniformity of the display panel at different display brightness is affected, and the display effect of the display panel is thus affected.

In the embodiments of the present disclosure, a time period between the start time of the initialization writing phase and the start time of the data writing phase in the same data writing frame is used as the initialization phase, and an initialization signal written in the initialization writing phase and/or the initialization phase can improve the internal ion polarization and threshold voltage shift caused by the fact that the voltage difference between the source and/or drain of the drive transistor and the gate of the drive transistor remains unchanged for a long time. Meanwhile, the display panel presents different display brightness in different modes, and when the display panel presents different display brightness, the voltage at the gate of the drive transistor is different. At this time, the difference in the duration of the initialization writing phase and/or the initialization phase is controlled in different brightness modes so that the bias state of the drive transistor in each brightness mode is adjusted in a targeted manner, thereby ensuring the display uniformity in different brightness modes.

The preceding is the core idea of the present disclosure. Based on the embodiments of the present disclosure, all other embodiments acquired by those of ordinary skill in the art are within the scope of the present disclosure on the premise that no creative work is done. Technical schemes in embodiments of the present disclosure are described clearly and completely hereinafter in conjunction with the drawings in the embodiments of the present disclosure.

Figure 2:
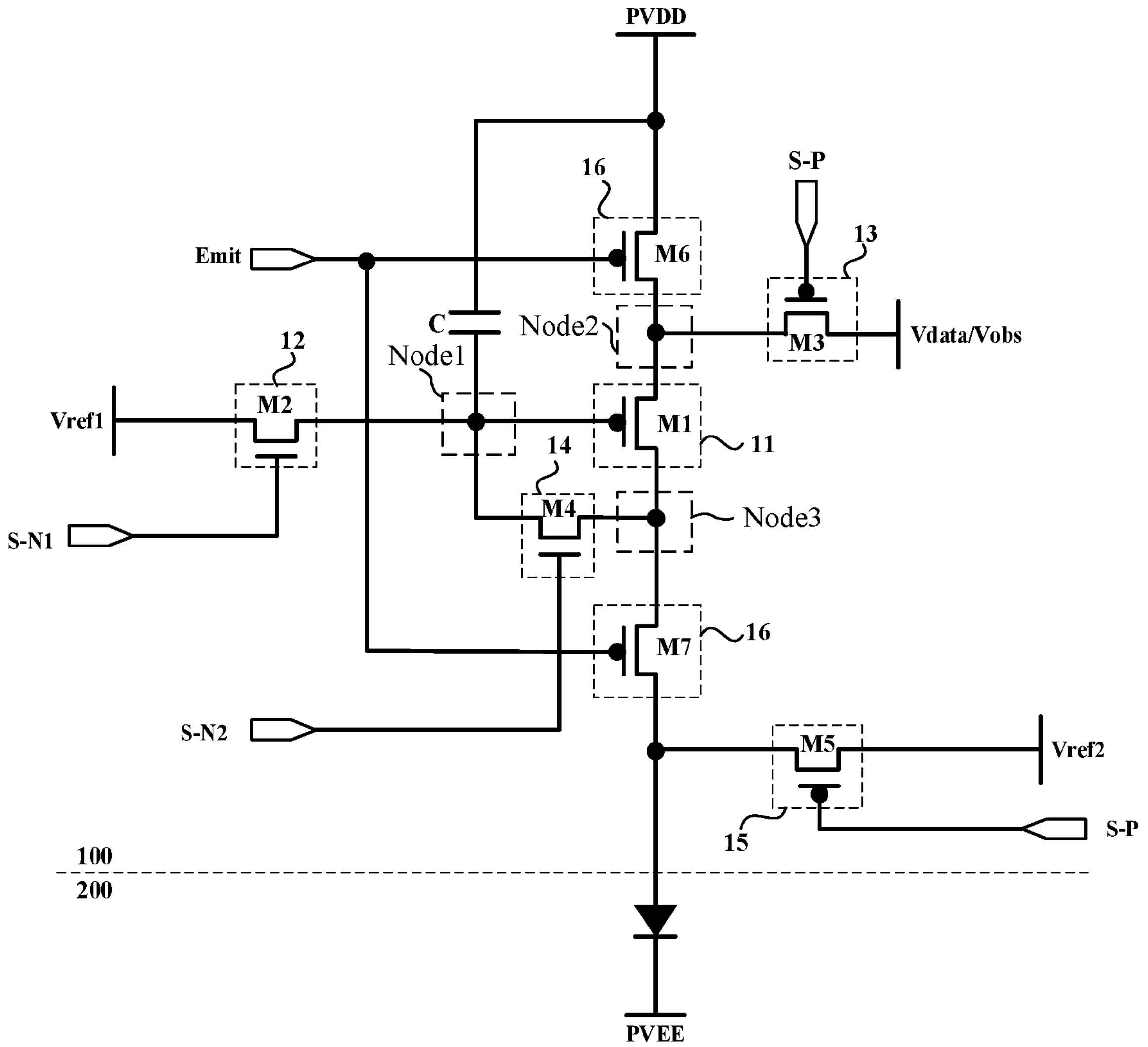
FIG. 2 is a schematic diagram illustrating the structure of a pixel circuit in a display panel according to an embodiment of the present disclosure.
Figure 3:
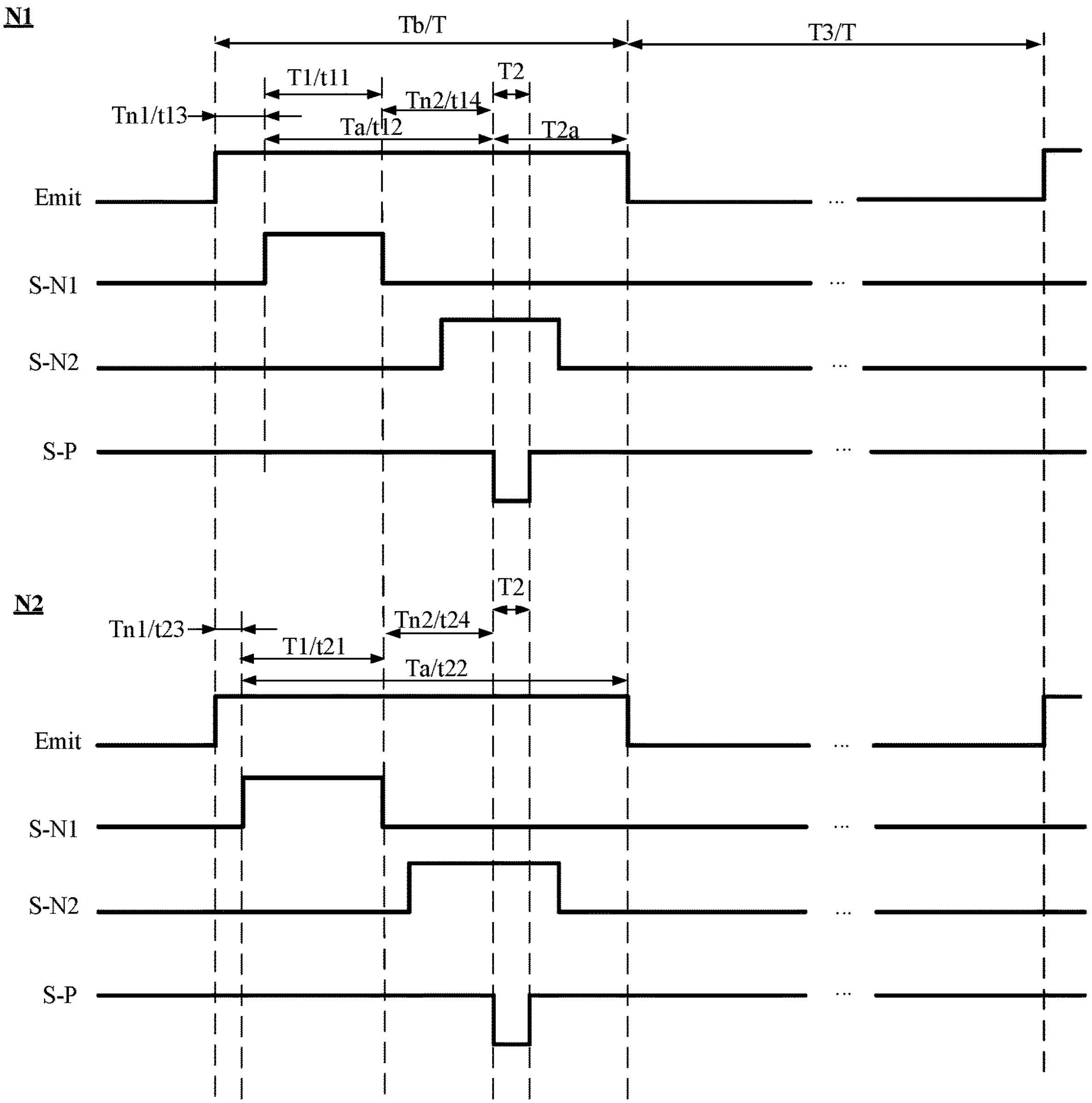
FIG. 3 is a drive timing diagram of a pixel circuit in a display panel according to an embodiment of the present disclosure.

FIG. 1 is a diagram illustrating the structure of a display panel according to an embodiment of the present disclosure. FIG. 2 is a schematic diagram illustrating the structure of a pixel circuit in a display panel according to an embodiment of the present disclosure. FIG. 3 is a drive timing diagram of a pixel circuit in a display panel according to an embodiment of the present disclosure. Referring to FIGS. 1 to 3, an embodiment of the present disclosure provides a display panel 10, the display panel 10 includes a pixel circuit 100 and a light-emitting element 200, and the pixel circuit 100 includes a drive module 11, an initialization module 12, and a data writing module 13. The drive module 11 includes a drive transistor M1, the drive module 11 is configured to selectively provide a drive current to the light-emitting element 200, and the operation process of the pixel circuit 100 includes a data writing phase T2 and an initialization writing phase T1. In the data writing phase T2, the data writing module 13 provides a data signal Vdata; and in the initialization writing phase T1, the initialization module 12 provides an initialization signal Vref1.

It can be understood that the display panel 10 may include pixel circuits 100 arranged in an array and light-emitting elements 200 electrically connected to the pixel circuits 100 in one-to-one correspondence. A data signal is provided for each pixel circuit 100 separately so that the drive module 11 in the pixel circuit 100 can selectively supply the drive current to the light-emitting element 200 to drive the light-emitting element 200 to emit light for display. In this manner, the display panel 10 can present a corresponding display screen.

The light-emitting element 200 is generally a current-type drive element, and the data signal received by the pixel circuit 100 is generally a voltage signal. Therefore, the data signal received by the pixel circuit 100 may be written into the gate of the drive transistor M1 by the configuration of the drive transistor M1 in the drive module 11. Moreover, a positive power signal PVDD is supplied through the source or drain of the drive transistor M1 so that the drive transistor M1 generates a corresponding drive current according to the threshold voltage of the drive transistor M1 and the voltage difference between the voltage of the gate of the drive transistor M1 and the positive power signal PVDD, and the drive current is provided to the light-emitting element 200 to drive the light-emitting element 200 to emit light of corresponding brightness. In this case, one of the source or the drain of the drive transistor M1 may be coupled to a positive power signal terminal, and the other may be coupled to the anode of the light-emitting element 200. The cathode of the light-emitting element 200 may be electrically connected to a negative power signal terminal. Thus, since a voltage difference exists between the positive power signal PVDD at the positive power signal terminal and the negative power signal PVEE at the negative power signal terminal, a current path is formed. In this manner, the drive transistor M1 may generate a drive current and provide the drive current for the light-emitting element 200 to drive the light-emitting element 200 to emit light.

It can be understood that the active layer material of the drive transistor M1 in the drive module 11 may include a low-temperature polysilicon material so that the drive transistor M1 has high carrier mobility, meeting the requirements such as high reaction speed and low power consumption. In this case, the drive transistor M1 may be a PMOS transistor. In other alternative embodiments, the active layer material of the drive transistor M1 may also include an oxide semiconductor material. In this case, the drive transistor M1 may be an NMOS transistor. The material and type of the drive transistor M1 are not limited in this embodiment of the present disclosure on the premise that core invention points of embodiments of the present disclosure can be implemented.

It should be noted that the source and the drain of the transistor are not constant but change as the state of the transistor changes. FIG. 2 only illustratively shows the case where the drive transistor M1 is a PMOS transistor. In this case, the drain of the drive transistor M1 is coupled to the light-emitting element 200, and for the drive transistor M1 of PMOS-type, the drive current I generated by the drive transistor M1 is positively related to $k(PVDD-Vdata)^2$. The positive power signal PVDD is generally a constant value. When PVDD is constantly greater than Vdata, the smaller the Vdata is, the larger the drive current I is, and the greater the display light-emitting brightness of the light-emitting element 200 is.

For ease of description, without special limitations, an example in which the drive transistor is a PMOS transistor is used in embodiments of the present disclosure for illustratively describing the technical schemes in embodiments of the present disclosure.

With reference to FIG. 2, the pixel circuit 100 may also include an initialization module 12, one terminal of the initialization module 12 receives an initialization signal Vref1, and the other terminal is electrically connected to the gate of the drive transistor M1. In the initialization phase Ta, the initialization module 12 may transmit the initialization signal Vref1 to the gate of the drive transistor M1 to initialize the gate of the drive transistor M1. In an embodiment, the initialization module 12 may be turned on or off under the control of a scan signal S-N1, and when the scan signal SN-1 controls the initialization module 12 to be turned on, the initialization signal Vref1 is transmitted to the gate of the drive transistor M1. In this case, the initialization module 12 may include an initialization transistor M2. The gate of the initialization transistor M2 receives a scan signal S-N1, a first electrode of the initialization transistor M2 receives the initialization signal Vref1, and a second electrode of the initialization transistor M2 and the gate of the drive transistor M1 are electrically connected to a node Node1.

With continued reference to FIG. 2, the pixel circuit 100 also includes a data writing module 13 for providing a data signal Vdata to the gate of the drive transistor M1 in the data writing phase T2. In an embodiment, when the data signal Vdata received by the drive transistor M1 is different, the drive current generated by the drive transistor M1 is different so that the light-emitting element 200 has different light-emitting brightness. One terminal of the data writing module 13 may receive the data signal Vdata, and the other terminal of the data writing module 13 and the source of the drive transistor M1 may be electrically connected to a node Node2. Moreover, the data writing module 13 may be turned on or off under the control of a scan signal S-P. When the scan signal S-P controls the data writing module 13 to be turned on, the data writing module 13 may write the data signal Vdata into the source of the drive transistor M1, and then the data signal Vdata is transmitted to the gate of the drive transistor M1 from the source of the drive transistor M1. In this case, the data writing module 13 may include a data writing transistor M3. The gate of the data writing transistor M3 may receive the scan signal S-P, a first electrode of the data writing transistor M3 receives the data signal Vdata, and a second electrode of the data writing transistor M3 is electrically connected to the source of the drive transistor M1.

Alternatively, with continued reference to FIG. 2, the pixel circuit 100 may also include a compensation module 14 electrically connected between the drain and the gate of the drive transistor M1, that is, one terminal of the compensation module 14 and the drain of the drive transistor M1 are electrically connected to a node Node3, and the other terminal of the compensation module 14 and the gate of the drive transistor M1 are electrically connected to the node Node1. The compensation module 14 may compensate the threshold voltage of the drive transistor M1 to the gate of the drive transistor M1 while the data signal Vdata is written so that when the drive module M1 provides the drive current for the light-emitting element 200, the influence of the threshold voltage of the drive transistor M1 on the drive current provided by the drive transistor M1 can be canceled or alleviated. Illustratively, the compensation module 14 may be turned on or off under the control of a scan signal S-N2, and when the scan signal S-N2 controls the compensation module 14 to be turned on, the compensation module 14 can adjust the voltage between the gate and the drain of the drive transistor M1 and compensate the threshold voltage of the drive transistor M1. In this case, the compensation module 14 may include a compensation transistor M4, a first electrode of the compensation transistor M4 is electrically connected to the drain of the drive transistor M1, a second electrode of the compensation transistor M4 is electrically connected to the gate of the drive transistor M1, and the gate of the compensation transistor M4 receives the scan signal S-N2.

Alternatively, with continued reference to FIG. 2, the pixel circuit 100 may also include a reset module 15 capable of providing a reset signal Vref2 to the anode of the light-emitting element 200 to reset the anode of the light-emitting element 200. In this manner, the signal provided to the anode of the light-emitting element 200 in the previous light-emitting phase is prevented from affecting the light-emitting accuracy of the light-emitting element 200 in the next light-emitting phase. As such, a reset phase in which the reset module 15 provides the reset signal Vref2 to the light-emitting element 200 should be in a non-light-emitting phase before the light-emitting phase. In an embodiment, one terminal of the reset module 15 may receive the reset signal Vref2, and the other terminal may be electrically connected to the anode of the light-emitting element 200. The reset module 15 may be turned on or off under the control of the scan signal S-P, and when the scan signal S-P controls the reset module 15 to be turned on, the reset module 15 may transmit the reset signal Vref2 to the anode of the light-emitting element 200 to reset the light-emitting element 200. In this case, the reset module 15 may include a reset transistor M5, the gate of the reset transistor M5 may receive the scan signal S-P, a first electrode of the reset transistor M5 receives the reset signal Vref2, and a second electrode of the reset transistor M5 is electrically connected to the anode of the light-emitting element 200.

Alternatively, with continued reference to FIG. 2, the pixel circuit 100 may also include a light-emitting control module 16 capable of controlling the time at which the drive transistor M1 provides the drive current to the light-emitting element 200. The light-emitting control module 16 may be connected to the light-emitting element 200 and the drive transistor M1 in series between the positive power signal terminal and the negative power signal terminal. The light-emitting control module 16 may include a first light-emitting control transistor M6 and a second light-emitting control transistor M7. The gate of the first light-emitting control transistor M6 and the gate of the second light-emitting control transistor M7 both receive a light-emitting control signal Emit. The first electrode of the first light-emitting control transistor M6 receives the positive power signal PVDD, and the second electrode of the first light-emitting control transistor M6 is electrically connected to the source of the drive transistor M1. A first electrode of the second light-emitting control transistor M7 is electrically connected to the drain of the drive transistor M1, and a second electrode of the second light-emitting control transistor M7 is electrically connected to the anode of the light-emitting element 200. The light-emitting control signal Emit may be a pulse signal. When the first light-emitting control transistor M6 and the second light-emitting control transistor M7 are both NMOS transistors, the high level of the light-emitting control signal Emit controls the first light-emitting control transistor M6 and the second light-emitting control transistor M7 to be turned on, while the low level of the light-emitting control signal Emit controls the first light-emitting control transistor M6 and the second light-emitting control transistor M7 to be turned off. When the first light-emitting control transistor M6 and the second light-emitting control transistor M7 both are PMOS transistors, the low level of the light-emitting control signal Emit controls the first light-emitting control transistor M6 and the second light-emitting control transistor M7 to be turned on, while the high level of the light-emitting control signal Emit controls the first light-emitting control transistor M6 and the second light-emitting control transistor M7 to be turned off. Thus, the on-time duration of the first light-emitting control transistor M6 and the second light-emitting control transistor M7 can be controlled by controlling the duty cycle of the light-emitting control signal Emit.

Additionally, with continued reference to FIG. 2, the pixel circuit 100 may also include a storage capacitor C that may be used for storing the voltage of the gate of the drive transistor M1. The connection manner of the storage capacitor C may be determined according to actual situations, and the connection manner of the storage capacitor is not limited in the embodiments of the present disclosure on the premise that the gate potential of the drive transistor M1 can be stored.

With continued reference to FIGS. 1 to 3, the time of one screen frame of the display panel 10 includes at least a data writing frame T, and the data writing frame T includes the initialization writing phase T1, the data writing phase T2, and a light-emitting phase T3. In the initialization phase T1, the initialization module 12 is turned on under the control of the scan signal S-N1, and the initialization signal Vref1 is written into the node Node1 electrically connected to the gate of the drive transistor M1 to initialize the gate of the drive transistor M1. In the data writing phase T2, the data writing module 13 is turned on under the control of the scan signal S-P, and the compensation module 14 is turned on under the control of the scan signal S-N2 so that the data signal Vdata is written into the gate of the drive transistor M1 sequentially through the data writing transistor M3, the drive transistor M1, and the compensation transistor M4. Meanwhile, in the data writing phase T2, the reset module 15 is turned on under the control of the scan signal S-P, and the reset signal Vref2 is written into the anode of the light-emitting element 200 to initialize the anode of the light-emitting element 200. In the light-emitting phase T3, the light-emitting control module 16 is turned on under the control of the light-emitting control signal Emit so that the drive current generated by the drive module 11 can be transmitted to the anode of the light-emitting element 200, the positive power signal PVDD passes through the light-emitting control module 16 and the drive module 11, and the drive current is generated to drive the light-emitting element 200 to emit light.

Meanwhile, in different application scenarios, the display panel 10 may have different operation modes, and in different operation modes, the display panel 10 may present different display brightness. For example, to enable a screen presented by the display panel 10 to be recognized by human eyes in a relatively bright environment, the screen displayed by the display panel 10 is generally controlled to have relatively high display brightness; and in a relatively dark environment, to prevent human eyes from being damaged by the high display brightness of the screen presented by the display panel 10, it is common to control the screen displayed by the display panel 10 to have relatively low display brightness. The relationship between the gray scale (that is, the light-emitting brightness level of the light-emitting element) and the data signal is adjusted so that the display panel 10 may have different display brightness in different operation modes.

When the operation mode of the display panel 10 includes a first mode N1 and a second mode N2, and the brightness of the display panel 10 in the first mode N1 is different from the brightness of the display panel 10 in the second mode N2, for the data signal Vdata received by the gate of the drive transistor M1 in the same pixel circuit 100, the data signal Vdata in the first mode N1 is different from the data signal Vdata in the second mode N2 in a case where the display panel 10 presents the same screen in the first mode N1 and the second mode N2. In this manner, the voltage difference between the gate of the drive transistor M1 and the source and/or drain of the drive transistor M1 in the pixel circuit 100 is caused in different modes so that in the pixel circuit 100, the bias condition of the drive transistor M1 in the first mode N1 is different from the bias condition of the drive transistor M1 in the second mode N2.

In view of this, when the display mode of the display panel 10 includes the first mode N1 and the second mode N2, the display brightness of the display panel 10 in the first mode N1 is different from the display brightness of the display panel 10 in the second mode N2; the duration of the initialization phase Ta in the first mode N1 is different from the duration of the initialization phase Ta in the second mode N2, and/or the duration of the initialization writing phase T1 in the first mode N1 is different from the duration of the initialization writing phase T1 in the second mode N2. In the same data writing frame, a time period between the start time of the initialization writing phase T1 and the start time of the data writing phase T2 is the initialization phase Ta.

In an embodiment, the duration of the initialization writing phase T1 and/or the duration of the initialization phase Ta for adjusting the bias of the drive transistor M1 may be different in the first mode and the second mode so that the duration in which the gate of the drive transistor M1 remains at the initialization signal Vref1 may be different. When the voltage of the source and/or the drain of the drive transistor M1 is Vs/d, if the duration in which the gate of the drive transistor M1 remains at the initialization signal Vref1 is different, the duration of the voltage difference (the initialization signal Vref1−Vs/d) between the gate of the drive transistor M1 and the source and/or drain of the drive transistor M1 is different. In this manner, the drive transistor M1 may have different bias states. In other words, different bias states of the drive transistor M1 may be caused by the difference in the duration of the corresponding voltage difference between the source and/or the drain and the gate. Thus, the bias generated by writing the data signal Vdata of different voltages into the drive transistor M1 in the data writing phase T2 under different modes can be balanced.

It can be understood that FIG. 3 only illustratively shows that the duration of the initialization writing phase T1 in the first mode N1 is different from the duration of the initialization writing phase T1 in the second mode N2, while the duration of the initialization phase Ta in the first mode N1 is also different from the duration of the initialization phase Ta in the second mode N2. However, in this embodiment of the present disclosure, it is possible that only the duration of the initialization writing phase T1 is different in different modes. In this case, the time for providing the initialization signal Vref1 to the gate of the drive transistor M1 is different in different modes so that the time for the gate of the drive transistor M1 remaining at the initialization signal Vref1 is different in different modes. Alternatively, in other alternative embodiments, it is possible that only the duration of the initialization phase Ta is different in different modes. In this case, the time for the gate of the drive transistor M1 remaining at the initialization signal Vref1 is also different in different modes. No limitation is made in this embodiment of the present disclosure on the premise that core invention points of embodiments of the present disclosure can be implemented.

It should be noted that the above only describes an example where when the initialization phase Ta is entered, the signal at the gate of the drive transistor M1 is consistent with the initialization signal Vref1, while the signals at the source and the drain of the drive transistor remain the same as the signals before the initialization phase Ta. However, in the embodiments of the present disclosure, the signals at the source and the drain of the drive transistor M1 may vary with the progress of the initialization phase Ta.

Figure 4:
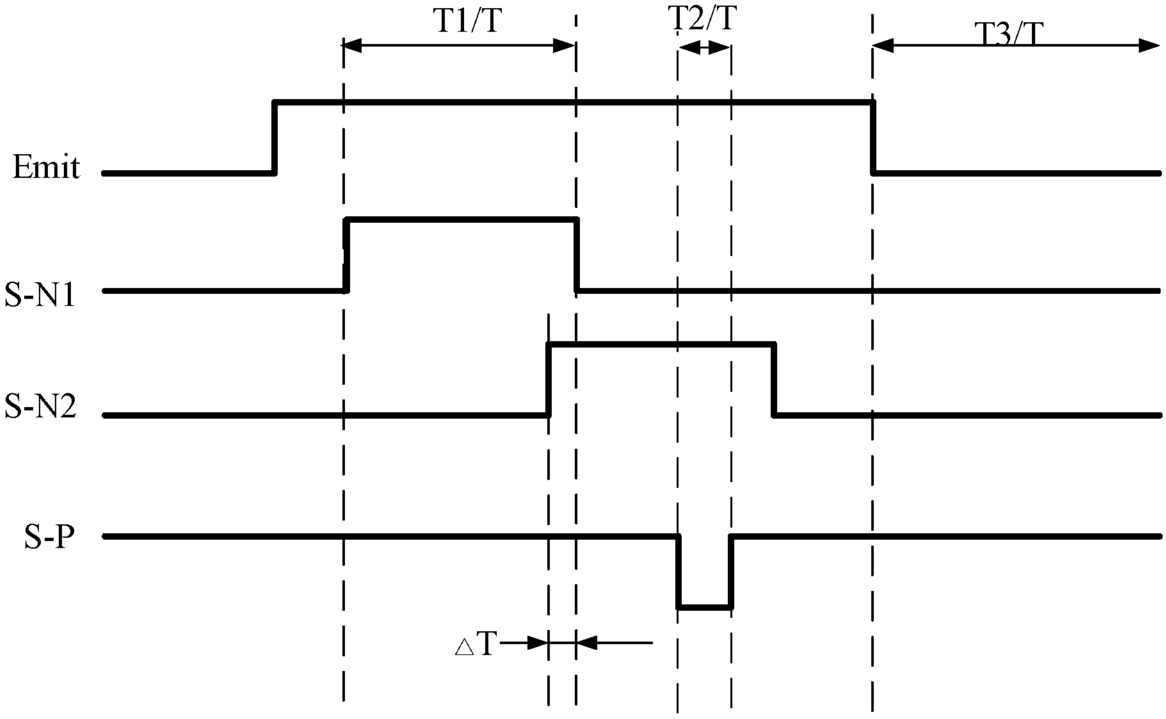
FIG. 4 is a drive timing diagram of a pixel circuit in another display panel according to an embodiment of the present disclosure.

Illustratively, as shown in FIG. 4 and FIG. 2, when the initialization phase Ta is entered, the active level time of the scan signal S-N1 for controlling the initialization module 12 to be turned on and the active level time of the scan signal S-N2 for controlling the compensation module 14 to be turned on may overlap, and the overlap time is ΔT. In this case, within ΔT, the scan signal S-N1 controls the initialization module 12 to be turned on, while the scan signal S-N2 controls the compensation module 14 to be turned on so that the initialization signal Vref1 is transmitted to the gate of the drive transistor M1 via the initialization module 12 and then transmitted to the drain of the drive transistor via the compensation module 14. Thus, the signals at the gate, drain, and source of the drive transistor M1 all approach the initialization signal Vref1. In this manner, it is ensured that the voltage of the drain and the voltage of the gate of the drive transistor M1 coincide as much as possible so that the voltage difference between the gate and the drain of the drive transistor M1 is small enough, and the drive transistor M1 can change from the bias state to the non-bias state, thereby effectively reducing the threshold shift amount caused by the bias of the drive transistor M1.

Additionally, if the initialization signal Vref1 provided by the initialization module 12 to the gate of the drive transistor M1 can control the drive transistor M1 to be in an on-state, the initialization signal Vref1 may be transmitted to the source of the drive transistor M1 within ΔT so that the voltages of the gate, the source, and the drain of the drive transistor M1 are kept consistent, and the bias of the drive transistor M1 can be effectively adjusted, thereby ensuring the overall display effect of the display panel 10.

In conclusion, according to the display panel provided in the embodiments of the present disclosure, the difference in the duration of the initialization writing phase and/or the initialization phase is controlled in different brightness modes so that the bias state of the drive transistor in each brightness mode is adjusted in a targeted manner, the drive transistor M1 is initialized to different degrees, and then the bias of the drive transistor M1 is adjusted to different degrees. In this manner, the operation stability of the drive transistor M1 is ensured, the display uniformity in different brightness modes is ensured, and the display effect of the display panel 10 is improved.

It can be understood that the operation mode of the display panel mentioned in the embodiments of the present disclosure includes the first mode N1 and the second mode N2, which does not merely refer to two operation modes of the display panel; rather, the first mode N1 and the second mode N2 are adopted to represent different operation modes of the display panel, and the display panel may have different brightness in different operation modes. In this embodiment of the present disclosure, the operation mode of the display panel is different in different application scenarios so that the display panel has different brightness. For ease of description, unless otherwise specified, an example where the operation mode of the display panel includes two modes (a first mode and a second mode) is used in the embodiments of the present disclosure for describing technical schemes in this embodiment of the present disclosure.

Alternatively, with continued reference to FIGS. 2 and 3, the brightness of the display panel 10 in the first mode N1 is less than the brightness of the display panel 10 in the second mode N2; in the first mode N1, the duration of the initialization writing phase T1 is t11, and the duration of the initialization phase Ta is t12; in the second mode N2, the duration of the initialization writing phase T1 is t21, and the duration of the initialization phase Ta is t22; t21>t11 and t22>t12.

The relationship between the gray scale (that is, the light-emitting brightness level of the light-emitting element) and the data signal is adjusted so that the display panel has different display brightness in different operation modes. If the brightness of the display panel in the first mode N1 is less than the brightness of the display panel 10 in the second mode N2, that is, when the brightness level (that is, the gray scale) presented by the light-emitting element 200 in the first mode N1 is n, the data signal to be provided to the drive transistor M1 in the pixel circuit 100 is Vdata1; while in the second mode N2, when the brightness level presented by the light-emitting element 200 is also n, the data signal to be provided to the drive transistor M1 in the pixel circuit 100 is Vdata2. If the drive transistor M1 is a PMOS transistor, Vdata1 is greater than Vdata2. Thus, the voltage difference between the gate and the source of the drive transistor M1 in the first mode N1 is greater than the voltage difference between the gate and the source of the drive transistor M1 in the second mode N2 so that the bias condition of the drive transistor M1 in the first mode N1 is different from that in the second mode N2. In this case, it is necessary to adjust the bias of the drive transistor M1 in different operation modes of the display panel 10.

Since the voltage of the data signal Vdata2 written into the gate of the drive transistor M1 in the data writing phase T2 of the second mode N2 is relatively small, the internal ion polarization of the drive transistor M1 due to the data signal Vdata2 is relatively weak. In this case, it is possible to increase the duration in which the gate of the drive transistor M1 remains at the initialization signal Vref1 so that the drive transistor M1 has relatively strong internal ion polarization under the action of the initialization signal Vref1, that is, the drive transistor M1 has a relatively high initialization degree. In the data writing phase T2 of the first mode N1, the voltage of the data signal Vdata1 written into the gate of the drive transistor M1 is relatively large so that the internal ion polarization of the drive transistor M1 due to the data signal Vdata1 is relatively strong. In this case, the duration in which the gate of the drive transistor M1 remains at the initialization signal Vref1 may be shortened so that the drive transistor M1 has relatively weak internal ion polarization under the action of the initialization signal Vref1, that is, the drive transistor M1 has a relatively low initialization degree. Thus, the duration of the initialization phase Ta and the duration of the initialization writing phase T1 in a high-brightness mode are both greater than the duration of the initialization phase Ta and the duration of the initialization writing phase T1 in a low-brightness mode so that it is possible to balance or improve the internal ion polarization and the threshold voltage shifting caused by the difference in the data signal Vdata provided to the gate of the drive transistor M1 in different brightness modes, and then it is possible to balance the bias condition generated after the data signal Vdata is provided to the drive transistor M1. In this manner, when the light-emitting phase T3 in different modes is entered, the bias condition of the drive transistor M1 can be kept consistent, thereby enabling the drive transistor M1 to accurately generate the drive current, facilitating the improvement of the display effect of the display panel, and improving the display uniformity of the display panel in different modes.

Figure 5:
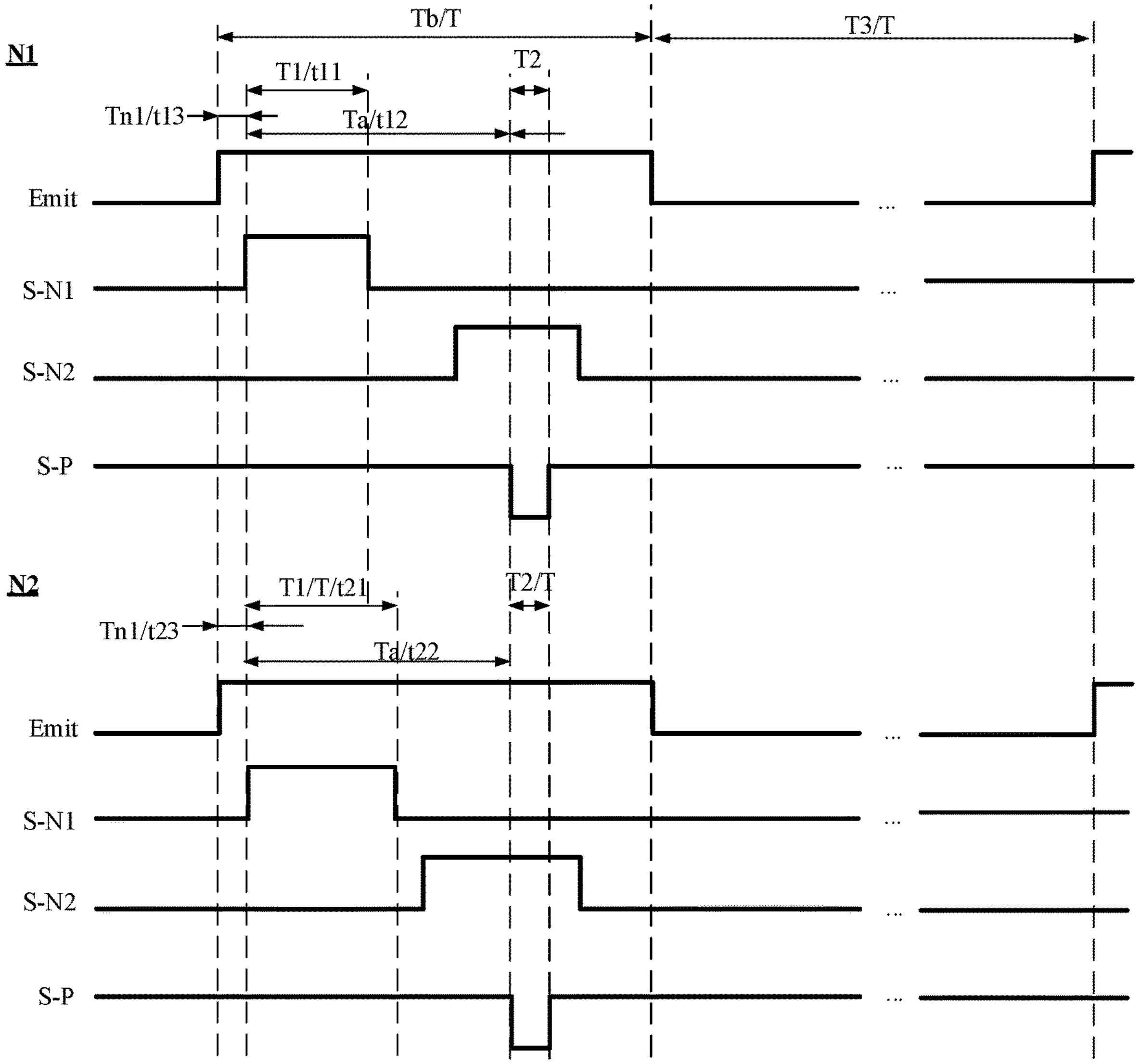
FIG. 5 is a drive timing diagram of a pixel circuit in another display panel according to an embodiment of the present disclosure.
Figure 6:
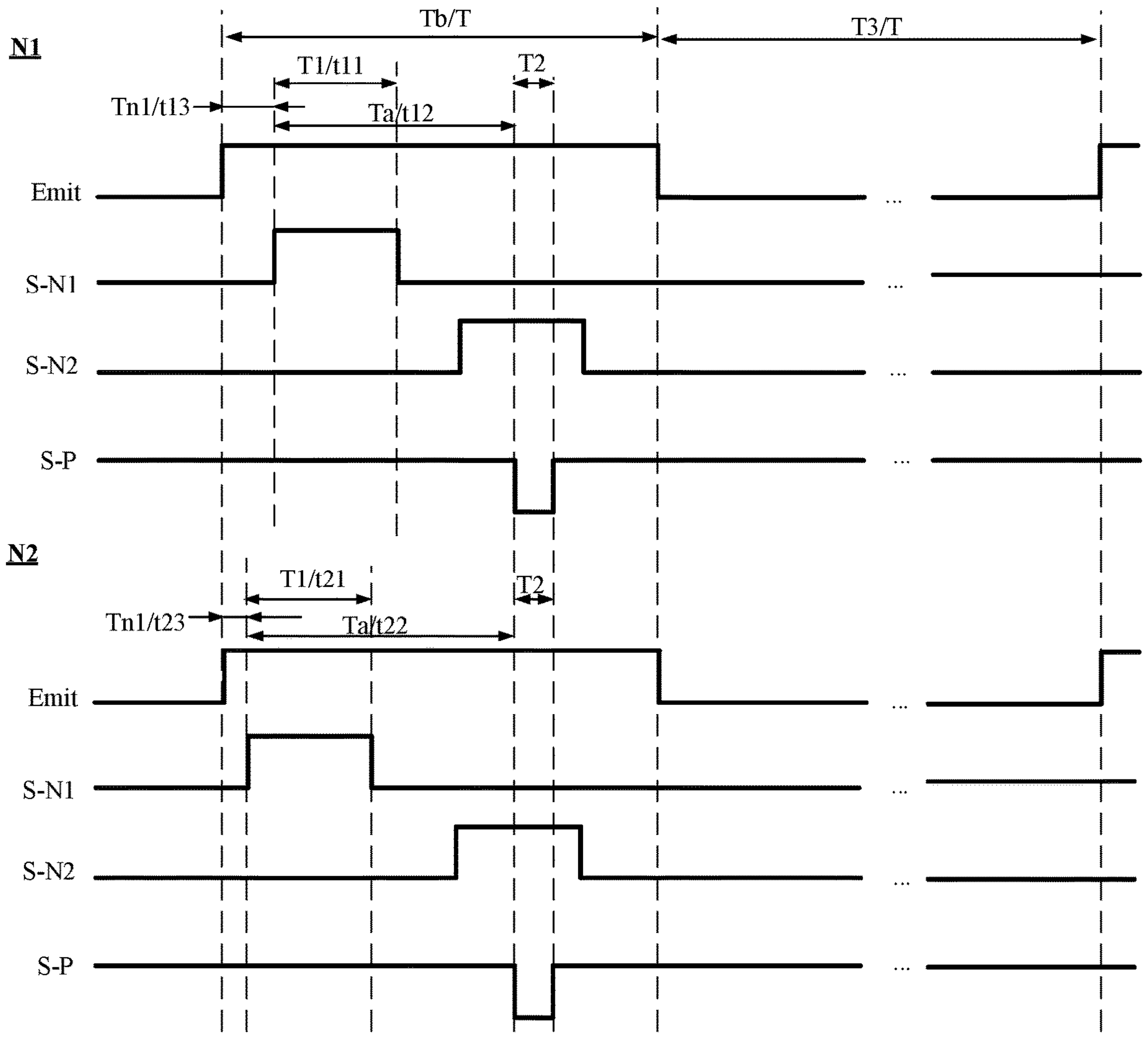
FIG. 6 is a drive timing diagram of a pixel circuit in another display panel according to an embodiment of the present disclosure.

It can be understood that FIG. 3 only illustratively shows that when the brightness of the display panel in the first mode N1 is less than the brightness of the display panel in the second mode N2, the duration of the initialization writing phase T1 in the first mode N1 is less than the duration of the initialization writing phase T1 in the second mode N2, while the duration of the initialization phase Ta in the first mode N1 is also less than the duration of the initialization phase Ta in the second mode N2. However, in the embodiments of the present disclosure, as shown in FIG. 5, it is also possible that only the duration of the initialization phase Ta in the first mode N1 is less than the duration of the initialization phase Ta in the second mode N2, that is, t21>t11; alternatively, as shown in FIG. 6, it is also possible that the duration of the initialization writing phase T1 in the first mode N1 is less than the duration of the initialization writing phase T1 in the second mode N2, that is, t22>t12. No limitation is made in the embodiments of the present disclosure on the premise that core invention points of embodiments of the present disclosure can be implemented.

Alternatively, with continued reference to FIGS. 1 to 3, when the data writing frame T includes a non-light-emitting phase Tb, and when the non-light-emitting phase Tb includes the data writing phase T2 and the initialization writing phase T1, the time period between the start time of the non-light-emitting phase Tb and the start time of the initialization writing phase T1 in the same non-light-emitting phase Tb is a first time period Tn1. The duration of the first time period Tn1 in the first mode N1 is t13, the duration of the first time period Tn1 in the second mode N2 is t23, and t23<t13.

The data writing frame T includes the non-light-emitting phase Tb and the light-emitting phase T3. In the light-emitting phase T3, the light-emitting control signal Emit is an enable signal. In this case, the first light-emitting control transistor M6 and the second light-emitting control transistor M7 are turned on, and the drive module 11 may provide the drive current to the light-emitting element 200. However, in the non-light-emitting phase Tb, the light-emitting control signal Emit is a non-enable signal. In the non-light-emitting phase Tb, the drive module 11 cannot provide the drive current to the light-emitting element 200, and the light-emitting element 200 does not emit light so that the voltage variation of the gate of the drive transistor M1 does not affect the overall brightness of the display panel. Thus, the initialization writing phase T1 and the data writing phase T2 may be configured in the non-light-emitting phase Tb. In the initialization writing phase T1, the drive transistor M1 may be initialized to clear the data signal Vdata written into the gate of the drive transistor M1 in the previous display screen frame, and the drive transistor M1 is controlled to be in the on-state, so as to prepare for writing the data signal Vdata of the current display screen frame. In the data writing phase T2, the data signal Vdata can be controlled to be written into the gate of the drive transistor M1, and the threshold voltage of the drive transistor M1 may be compensated so that in the light-emitting phase T3, the drive current provided by the drive transistor M1 can be independent of the threshold voltage of the drive transistor M1.

In addition, the non-light-emitting phase Tb also includes a first time period Tn1 which is a time period between the start time of the non-light-emitting phase Tb and the start time of the initialization writing phase T1, and the duration of the first time period Tn1 may determine the time when the drive transistor M1 is initialized, and then the duration in which the gate of the drive transistor M1 remains at the initialization signal Vref1 is determined, or the duration in which the gate of the drive transistor M1 is initialized is determined, that is, the initialization degree of the drive transistor M1 is determined.

In an embodiment, when the brightness of the display panel 10 in the first mode N1 is less than the brightness of the display panel 10 in the second mode N2, the duration of the first time period Tn1 in the first mode N1 may be adjusted to be longer so that after the non-light-emitting phase Tb in the first mode is entered, a longer time is needed to enter the initialization phase Ta. Thus, the gate of the drive transistor M1 remains at the data signal of a previous display screen frame in the non-light-emitting phase Tb for a relatively long time; while the duration of the first time period Tn1 in the second mode N2 is shorter so that it is possible to quickly enter the initialization phase Ta after the non-light-emitting phase Tb in the second mode is entered, which helps shorten the duration in which the gate of the drive transistor M1 remains the data signal of the previous display screen frame in the non-light-emitting phase Tb. In this manner, a sufficiently long time for the initialization phase Ta can be reserved for the second mode N2 with higher brightness, and a shorter time for the initialization phase Ta can be reserved for the first mode N1 with lower brightness so that the duration of the initialization phase Ta in the first mode N1 and the second mode N2 is configured, that is, the duration for the gate of the drive transistor M1 remaining as the initialization signal Vref1 is configured to ensure the balance of the bias adjustment of the drive transistor M1 in different modes, and thus the overall display effect of the display panel 10 is ensured. The time difference in entering the initialization writing phase T1 is adjusted so that it is possible to ensure sufficient time reserved for writing the data signal and then ensure the overall display effect of the display panel 10.

Figure 7:
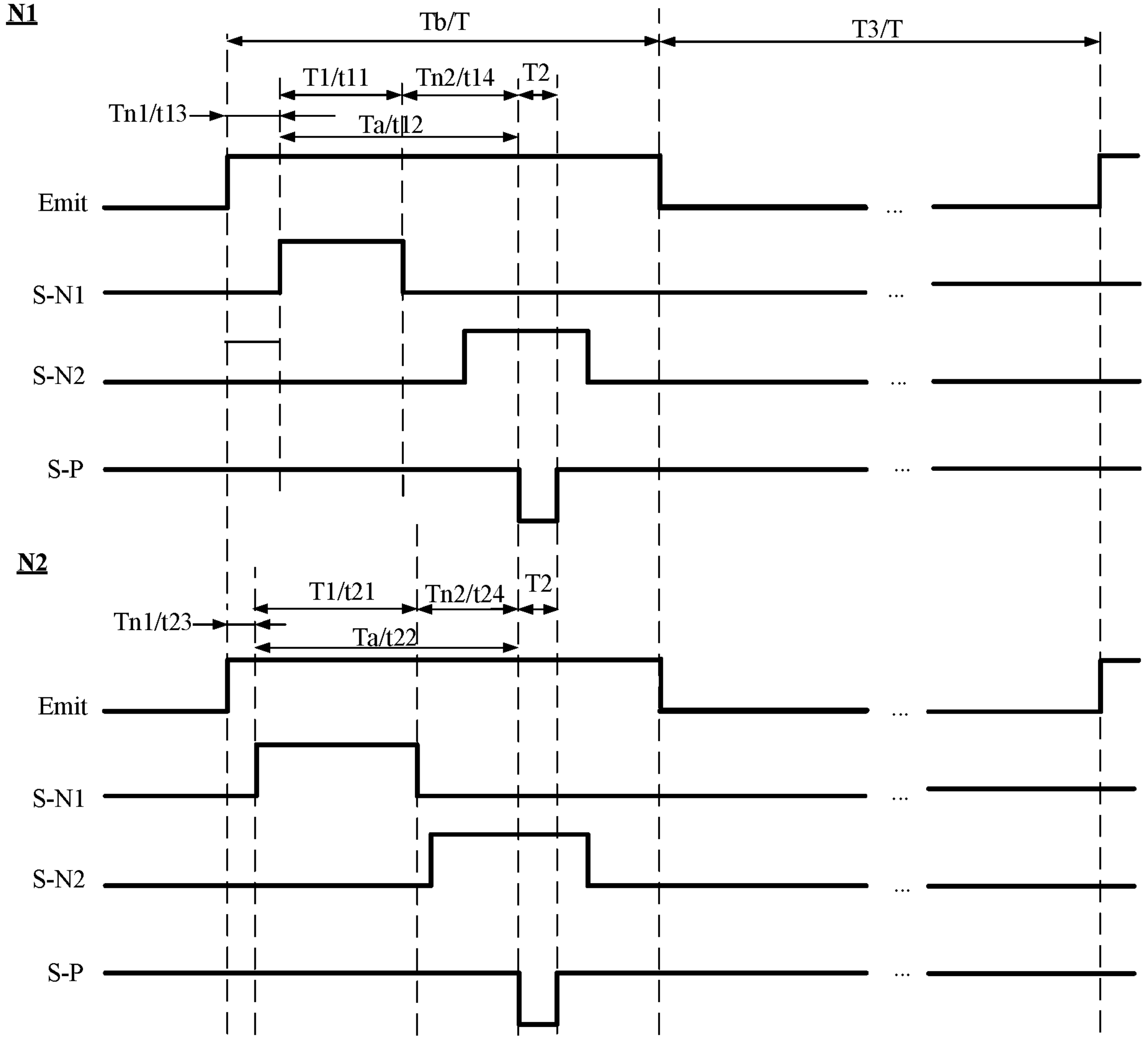
FIG. 7 is a drive timing diagram of a pixel circuit in another display panel according to an embodiment of the present disclosure.

In an embodiment, FIG. 7 is a drive timing diagram of a pixel circuit in another display panel according to an embodiment of the present disclosure. Referring to FIG. 1, FIG. 2, and FIG. 7, in the same data writing frame T, a time period between the end time of the initialization writing phase T1 and the start time of the data writing phase T2 is a second time period Tn2, the duration of the second time period Tn2 in the first mode N1 is t14, the duration of the second time period Tn2 in the second mode N2 is t24; and when t21>t11, and t22>t12, t24<t14.

When the non-light-emitting phase Tb also includes the second time period Tn2 that is the time period between the end time of the initialization writing phase T1 and the start time of the data writing phase T2, the duration of the second time period Tn2 may determine the duration in which the gate of the drive transistor M1 continues to keep the initialization signal Vref1 after the initialization signal Vref1 is written into the gate of the drive transistor M1.

Since the brightness of the display panel 10 in the first mode N1 is less than the brightness of the display panel 10 in the second mode N2, the duration of the second time period Tn2 in the first mode N1 may be adjusted to be longer so that the gate of the drive transistor M1 continues to keep the initialization signal Vref1 for longer time after the initialization writing phase T1 in the first mode N1; while the duration of the second time period Tn2 in the second mode is shorter so that after the initialization writing phase T1 in the second mode N2, the duration for the gate of the drive transistor M1 remaining as the initialization signal Vref1 is shorter. In this manner, a sufficiently long time for the initialization writing phase T1 can be reserved for the second mode N2 with higher brightness, and a shorter time for the initialization writing phase T1 can be reserved for the first mode N1 with lower brightness so that the duration of the initialization writing phase T1 in the first mode N1 and the second mode N2 is configured, that is, the duration for the gate of the drive transistor M1 remaining as the initialization signal Vref1 is configured to ensure the balance of the bias adjustment of the drive transistor M1 in different modes. In other words, the first mode N1 with lower brightness first ends the initialization writing phase T1, and the second mode N2 with higher brightness ends the initialization writing phase T1, so as to better balance the bias condition of the drive transistor M1 caused by the voltage of the data signal Vdata and then ensure the balance of the bias adjustment of the drive transistor M1 in different display modes, thereby ensuring the overall display effect of the display panel 10.

With continued reference to FIGS. 1 to 3, in the same data writing frame T, the time period between the end time of the initialization writing phase T1 and the start time of the data writing phase T2 is a second time period Tn2; in the first mode N1, the duration of the second time period Tn2 is t14; in the second mode N2, the duration of the second time period Tn2 is t24; and when t21>t11, and t22>t12, t24=t14.

The duration of the second time period Tn2 may determine the end time at which the initialization signal Vref1 is written into the gate of the drive transistor M1. Therefore, in the case where the second time period Tn2 in the first mode N1 with lower brightness is the same as the second time period Tn2 in the second mode N2 with higher brightness, the end time of the initialization writing phase T1 may be the same, that is, the duration in which the gate of the drive transistor M1 continues to be the initialization signal Vref1 after the initialization writing phase T1 is the same. In this case, the start time of the initialization writing phase T1 in the second mode N2 with higher brightness may be configured to be earlier than the start time of the initialization writing phase T1 in the first mode N1 with lower brightness so that the duration of the initialization writing phase T1 in the second mode N2 with higher brightness is longer than the duration of the initialization writing phase T1 in the first mode N1 with lower brightness, and the duration of the initialization phase Ta of the second mode N2 with higher brightness is longer than the duration of the initialization phase Ta of the first mode N1 with lower brightness. Thus, the bias of the drive transistor M1 caused by the voltage of the data signal Vdata can be better balanced, thereby ensuring the overall display effect of the display panel 10.

Referring to FIGS. 1, 2, and 5, the brightness of the display panel 10 in the first mode N1 is less than the brightness of the display panel 10 in the second mode N2; in the first mode N1, the duration of the initialization writing phase T1 is t11, and the duration of the initialization phase Ta is t12; in the second mode N2, the duration of the initialization writing phase T1 is t21, and the duration of the initialization phase Ta is t22; t21>t11, and t22=t12.

Referring to FIG. 5, the duration t11 of the initialization writing phase T1 in the first mode N1 is less than the duration t21 of the initialization writing phase T1 in the second mode N2, that is, t21>t11. In other words, the duration of the initialization writing phase T1 is increased in the second mode N2 with higher brightness so that the voltage of the gate of the drive transistor M1 can be adjusted in the initialization writing phase T1, and the initialization degree of the drive transistor M1 is higher. In the first mode N1 with lower brightness, the duration of the initialization writing phase T1 is reduced so that it is ensured that the voltage of the gate of the drive transistor M1 can be adjusted in the initialization writing phase T1, and the initialization degree of the drive transistor M1 is lower. In this manner, the bias of the drive transistor M1 caused by the writing of the data signal Vdata in different modes can be balanced.

Accordingly, the duration of the initialization phase Ta in the first mode N1 and the duration of the initialization phase Ta in the second mode N2 may be configured to be the same, that is, t22=t12. In this manner, it is ensured that the duration of other signals (for example, effective pulses of the scan signal S-P and the light-emitting control signal Emit) may be configured to be the same on the basis of differential initialization of the drive transistor M1 in different modes. Thus, the overall regularity can be ensured, and the difficulty in controlling the overall signal writing sequence by the display panel 10 can be simplified.

With continued reference to FIGS. 1, 2, and 5, the data writing frame T includes the non-light-emitting phase Tb; the non-light-emitting phase Tb includes the data writing phase T2 and the initialization writing phase T1; the time period between the start time of the non-light-emitting phase Tb and the start time of the initialization writing phase T1 in the same non-light-emitting phase Tb is a first time period Tn1; in the first mode N1, the duration of the first time period Tn1 is t13; in the second mode N2, the duration of the first time period Tn1 is t23; and t23=t13.

Referring to FIG. 5, the duration of the first time period Tn1 in the first mode N1 is equal to the duration of the first time period Tn1 in the second mode N2, that is, t23=t13. In other words, the first mode N1 with lower brightness and the second mode N2 with higher brightness enter the initialization writing phase T1 at the same timing interval so that the timing regularity can be ensured, and the difficulty in controlling the overall signal writing sequence by the display panel 10 can be simplified. Meanwhile, the first mode N1 and the second mode N2 satisfy the following: t21>t11, and t22=t12 so that the duration of the initialization writing phase T1 may be increased in the second mode N2 with higher brightness. Thus, it is ensured that the drive transistor M1 in the second mode N2 with higher brightness has a higher initialization degree in the initialization writing phase T1 and that in the light-emitting phase T3 in different modes, the bias state of the drive transistor M1 is consistent.

With continued reference to FIGS. 1 to 3, in the same data writing frame T, the time period between the start time of the data writing phase T2 and the start time of the light-emitting phase T3 is a data maintenance phase T2*a*, the duration of the data maintenance phase T2*a* in the first mode N1 is the same as the duration of the data maintenance phase T2*a* in the second mode N2.

When the data writing phase T2 is entered, the data signal Vdata is written into the gate of the drive transistor M1 so that the voltage at the gate of the drive transistor M1 changes from the voltage of the initialization signal Vref1 to the voltage of the data signal Vdata, and similarly, the drive transistor M1 has bias under the effect of the voltage of the data signal Vdata. When the duration of the initialization phase Ta and/or the duration of the initialization writing phase T1 is configured to be different for different modes to balance the bias caused by different data signals in different modes, the data maintenance phases T2*a* in the first mode N1 and the second mode N2 may be configured to have the same duration so that the duration in which the gate of the drive transistor M1 remains at the data signal Vdata before the light-emitting phase T3 in the first mode N1 and the second mode N2 is the same. In this manner, the bias of the drive transistor M1 in the data maintenance phase T2*a* in the first mode N1 and the second mode N2 is only related to the data signal Vdata. Thus, when the duration of the initialization phase Ta and/or the duration of the initialization writing phase T1 is configured accordingly in different modes, the configuration manner of the drive timing of the pixel circuit 100 can be simplified, and the overall drive cost can be reduced.

Figure 8:
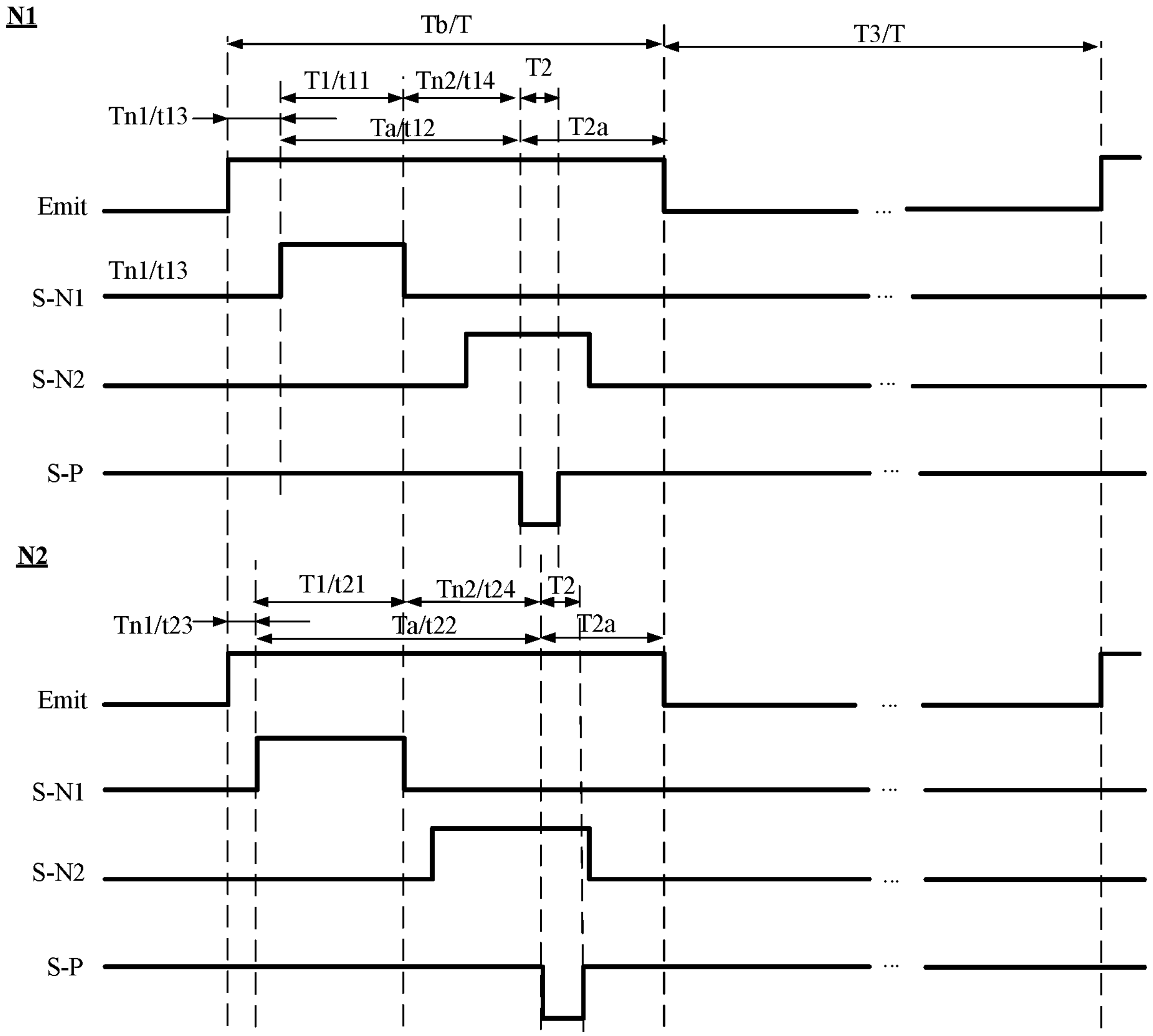
FIG. 8 is a drive timing diagram of a pixel circuit in another display panel according to an embodiment of the present disclosure.

Alternatively, FIG. 8 is a drive timing diagram of a pixel circuit in another display panel according to an embodiment of the present disclosure. With reference to FIGS. 1, 2, and 8, in the same data writing frame T, the time period between the start time of the data writing phase T2 and the start time of the light-emitting phase T3 is the data maintenance phase T2*a*, and the duration of the data maintenance phase T2*a* in the first mode N1 is different from the duration of the data maintenance phase T2*a* in the second mode N2.

In the data maintenance phase T2*a*, the signal at the gate of the drive transistor M1 is consistent with the data signal Vdata, and the data signal Vdata written into the gate of the drive transistor M1 in different modes is different. Thus, by the configuration of the duration of the initialization phase Ta and/or the duration of the initialization writing phase T1, the bias condition of the drive transistor M1 caused by the difference in the data signal Vdata is different. In this case, the drive transistor M1 is initialized to different degrees with respect to the data signal written into the drive transistor M1. However, the configuration of the duration of the initialization phase Ta and/or the duration of the initialization writing phase T1 is limited. Thus, to make the bias condition of the drive transistor M1 in the light-emitting phase T3 under different modes consistent, the duration of the data maintenance phase Ta2 in different modes may be configured for the difference in the written data signal so that after the bias condition caused by the voltage of the written data signal Vdata, the bias condition caused when the gate of the drive transistor M1 remaining the initialization signal Vref1, and the bias condition caused when the gate of the drive transistor M1 remaining the data signal Vdata are superimposed, the drive transistor M1 can be restored to a fixed bias state. In this manner, the consistency of the bias condition of the drive transistor M1 in different modes can be improved, and it is advantageous to ensure the display uniformity of the display panel 10.

It can be understood that in the case where the duration of the data maintenance phase is different in different brightness modes, for example, the duration of the data maintenance phase in the first mode may be greater than the duration of the data maintenance phase in the second mode, or the duration of the data maintenance phase in the first mode may be less than the duration of the data maintenance phase in the second mode, the configuration may be made according to practical requirements. No limitation is made in the embodiments of the present disclosure on the premise that the bias condition of the drive transistor M1 in different modes is consistent.

Figure 9:
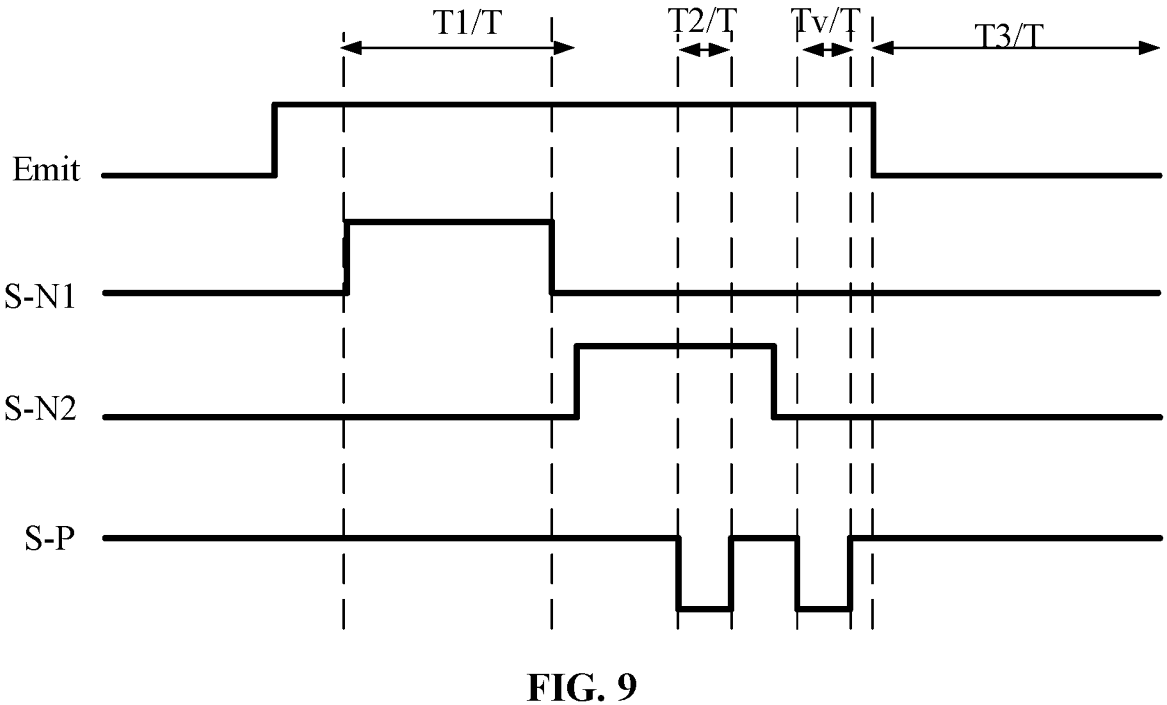
FIG. 9 is a drive timing diagram of a pixel circuit in another display panel according to an embodiment of the present disclosure.

In an embodiment, FIG. 9 is a drive timing diagram of a pixel circuit in another display panel according to an embodiment of the present disclosure. With reference to FIGS. 1, 2, and 9, the operation process of the pixel circuit 100 may also include a bias phase Tv, and in the bias phase Tv, the data writing module 13 provides a bias signal Vobs.

The pixel circuit 100 includes the bias phase Tv where the pixel circuit 100 may provide the bias signal Vobs to the source and/or the drain of the drive transistor M1 such that the voltage at the source and/or the drain of the drive transistor M1 is consistent with the bias signal Vobs, and the voltage difference between the gate of the drive transistor M1 and the source and/or the drain of the drive transistor M1 becomes consistent with the difference between the data signal Vdata and the bias signal Vobs. Thus, the bias state of the drive transistor M1 is adjusted, and the threshold voltage shift of the drive transistor M1 caused by long-time maintenance of the voltage difference between the gate of the drive transistor M1 and the source and/or the drain of the drive transistor M1 is improved or eliminated, thereby improving the display uniformity of the display panel 10 and ensuring the display effect of the display panel 10.

Meanwhile, the data writing module 13 is reused as a module for supplying the bias signal Vobs, that is, the data writing module 13 provides the data signal Vdata to the drive transistor M1 in the data writing phase T2 and provides the bias signal Vobs to the drive transistor M1 in the bias phase Tv. In this manner, it is ensured that the bias of the drive transistor M1 is adjusted, and the configuration space of the pixel circuit 100 can be saved. Moreover, the uniformity of the bias adjustment of the display panel 10 can be ensured, and the display balance of the display panel 10 can be ensured.

It should be noted that, with reference to FIGS. 2 and 9, the data writing module 13 is turned on or off under the control of the scan signal S-P. In this case, the data writing module 13 may include a data writing transistor M3, the gate of the data writing transistor M3 receives the scan signal S-P, a first electrode of the data writing transistor M3 receives the data signal Vdata or the bias signal Vobs, and a second electrode of the data writing transistor M3 is electrically connected to the source of the drive transistor M1. In the data writing phase T2, the scan signal S-P controls the data writing transistor M3 to be turned on, the first electrode of the data writing transistor M3 receives the data signal Vdata and transmits the data signal Vdata to the source of the drive transistor M1, and then the data signal Vdata is transmitted to the gate of the drive transistor M1 via the drive transistor M1 and the compensation transistor M4. While in the bias phase Tv, the scan signal S-P controls the data writing transistor M3 to be turned on again, the first electrode of the data writing transistor M3 receives the bias signal Vobs and transmits the bias signal Vobs to the source of the drive transistor M1, and meanwhile, the bias signal Vobs may also be transmitted to the drain of the drive transistor M1. In this case, transistors for supplying the bias signal and the data signal do not need to be separately configured, which can simplify the structure of the pixel circuit 100 and helps increase the number of pixel circuits 100 per unit area of the display panel 10, thereby improving the resolution of the display panel 10. Moreover, when the transistor providing the bias signal Vobs and the transistor providing the data signal Vdata are the same data writing transistor M3, the same scan signal S-P may be used for controlling the data writing transistor M3 to be turned on in the bias phase Tv and the data writing phase T2 separately to reduce the number of signals provided to the pixel circuit 100. Therefore, it is beneficial to simplify the structure of shift registers used for providing the scan signal S-P in the display panel 10 and helps to form the narrow bezel of the display panel 10.

Gates of the data writing transistors M3 of the pixel circuits located in the same row generally receive the same scan signal S-P, the data writing transistors M3 of the same column are generally electrically connected to the same first signal line L1, and the first signal line L1 is used for time-sharing transmission of the data signal Vdata of the data writing transistors M3. In this case, the bias phase Tv of pixel circuits 100 in an $i^{th}$ row may overlap the data writing phase T2 of pixel circuits 100 in an $(i+j)^{th}$ row, and the data signal Vdata of pixel circuits 100 in the $(i+j)^{th}$ row may be reused as the bias signal Vobs of pixel circuits 100 in the $i^{th}$ row. In this manner, no additional bias signal Vobs needs to be provided for each pixel circuit 100, which helps reduce the number of signals provided to the pixel circuits 100 and helps simplify the structure of the display panel 10. Accordingly, since the data signal Vdata is different in each pixel circuit 100 located in the same column, the bias signal Vobs provided for each pixel circuit 100 in the data writing frame T is a non-fixed signal.

In other alternative embodiments, when the bias signal Vobs of pixel circuits 100 in an $i^{th}$ row does not use the data signal Vdata of pixel circuits 100 in an $(i+j)^{th}$ row, the bias phase Tv of pixel circuits 100 in each row may be sequentially or simultaneously entered after the data writing phase T2 of pixel circuits 100 in the last row. At this time, all signal lines may simultaneously transmit the bias signal Vobs, and the voltage of the bias signal Vobs may be a fixed value so that the bias signal Vobs transmitted in each signal line does not change, and extra power consumption caused by continuous charging/discharging of each signal line due to frequent jumps of the bias signal Vobs is prevented, that is, the voltage of the bias signal Vobs may be a fixed value, which is advantageous to reduce the power consumption of the display panel 10.

Figure 10:
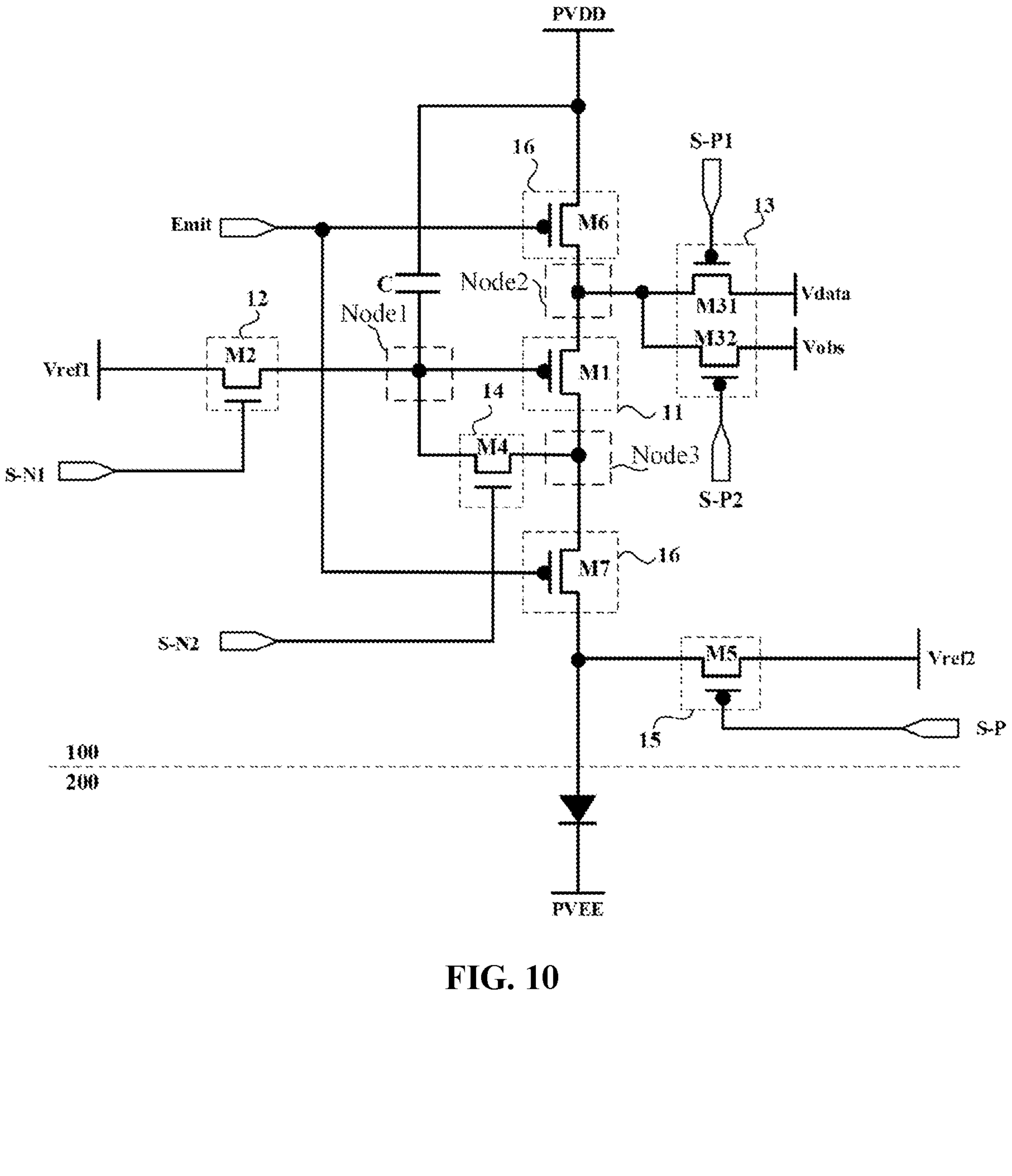
FIG. 10 is a schematic diagram illustrating the structure of a pixel circuit in another display panel according to an embodiment of the present disclosure.
Figure 11:
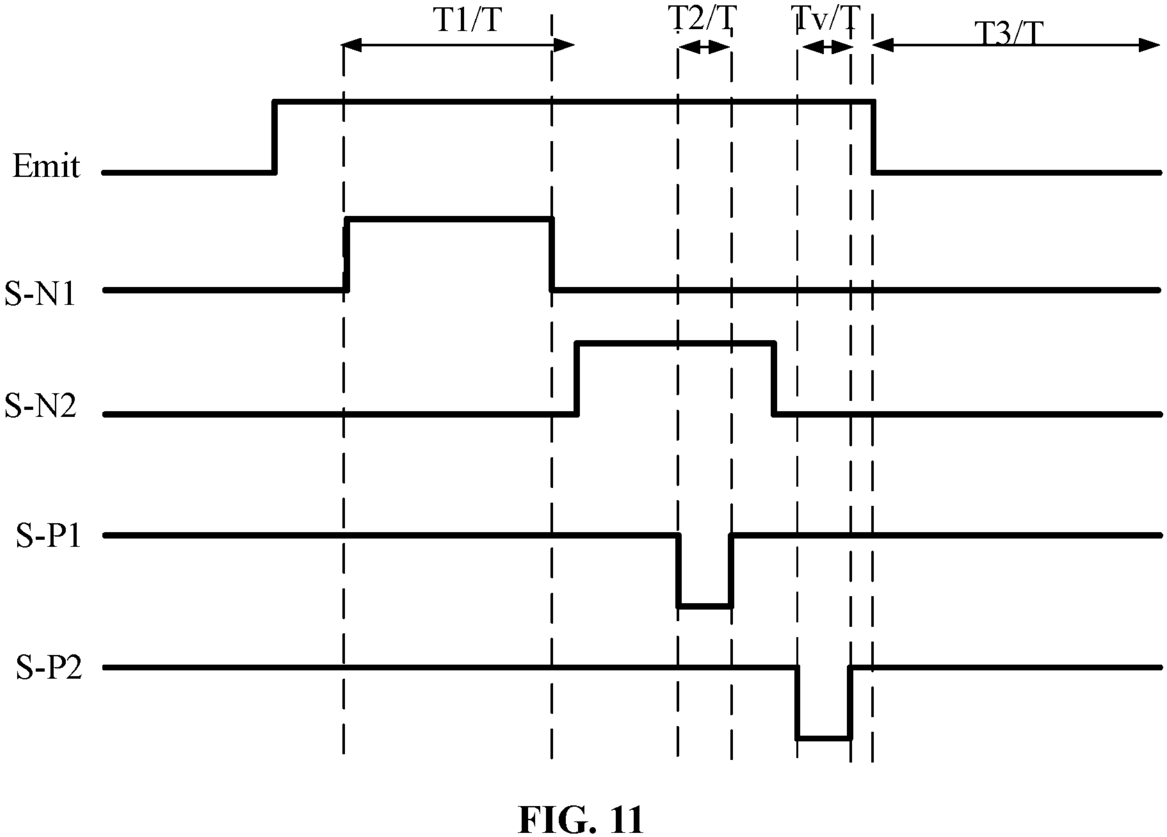
FIG. 11 is a drive timing diagram of a pixel circuit in a display panel corresponding to FIG. 10.

In another alternative embodiment, FIG. 10 is a schematic diagram illustrating the structure of a pixel circuit in another display panel according to an embodiment of the present disclosure. FIG. 11 is a drive timing diagram of a pixel circuit in a display panel corresponding to FIG. 10. With reference to FIGS. 10 and 11, the data writing module 13 may include a first transistor M31 and a second transistor M32. The gate of the first transistor M31 receives the first scan signal S-P1. The first electrode of the first transistor M31 receives the data signal Vdata. The second electrode of the first transistor M31 is electrically connected to the drive module 11. For example, the second electrode of the first transistor M31 may be electrically connected to the source of the drive transistor M1 in the drive module 11. In the data writing phase T2, the first scan signal S-P1 controls the first transistor M31 to be turned on so that the data signal Vdata can be transmitted to the gate of the drive transistor M1 via the first transistor M31, the drive transistor M1, and the compensation module 14. The gate of the second transistor M32 receives the second scan signal S-P2. The first electrode of the second transistor M32 receives the bias signal Vobs. The second electrode of the second transistor M32 is electrically connected to the drive module 11. For example, the second electrode of the second transistor M32 may be electrically connected to the source of the drive transistor M1 in the drive module 11. In the bias phase, the second scan signal S-P2 controls the second transistor M32 to be turned on so that the bias signal Vobs can be transmitted to the source of the drive transistor M1, meanwhile, the bias signal Vobs may also be transmitted to the drain of the drive transistor M1. In this manner, different transistors are used for transmitting the data signal Vdata and the bias signal Vobs so that the transmission of the data signal Vdata and the transmission of the bias signal Vobs do not affect each other, facilitating the improvement of the accuracy of the transmitted signals.

It can be understood that FIG. 10 only illustratively shows the case where the second electrodes of the first transistor M31 and the second transistor M32 are both electrically connected to the source of the drive transistor M1, while in other embodiments of the present disclosure, one of the second electrode of the first transistor or the second electrode of the second transistor may be electrically connected to the source of the drive transistor, and the other second electrode may be electrically connected to the drain of the drive transistor. The manner in which the first transistor and the second transistor are connected to the drive transistor is not limited in the embodiments of the present disclosure on the premise that core invention points of embodiments of the present disclosure can be implemented.

In an embodiment, when transistors transmitting the data signal Vdata and the bias signal Vobs are different, the voltage of the bias signal Vobs provided to each pixel circuit may be a fixed value so that the voltage of the provided bias signal Vobs does not need to be changed within the time of one screen frame of the display panel, and extra power consumption caused by frequent jumps of the bias signal Vobs is prevented, thus facilitating the low power consumption of the display panel.

In an alternative embodiment, the voltage of the bias signal in the first mode is V11; when the voltage of the bias signal in the second mode is V21, it is possible that V11=V21. In this manner, the voltage of the bias signal Vobs provided to the drive transistor M1 in different modes is the same so that when the mode is switched, the voltage of the bias signal Vobs does not need to be changed, extra power consumption caused by the voltage of the bias signal Vobs is prevented, and the low power consumption of the display panel is facilitated.

Figure 12:
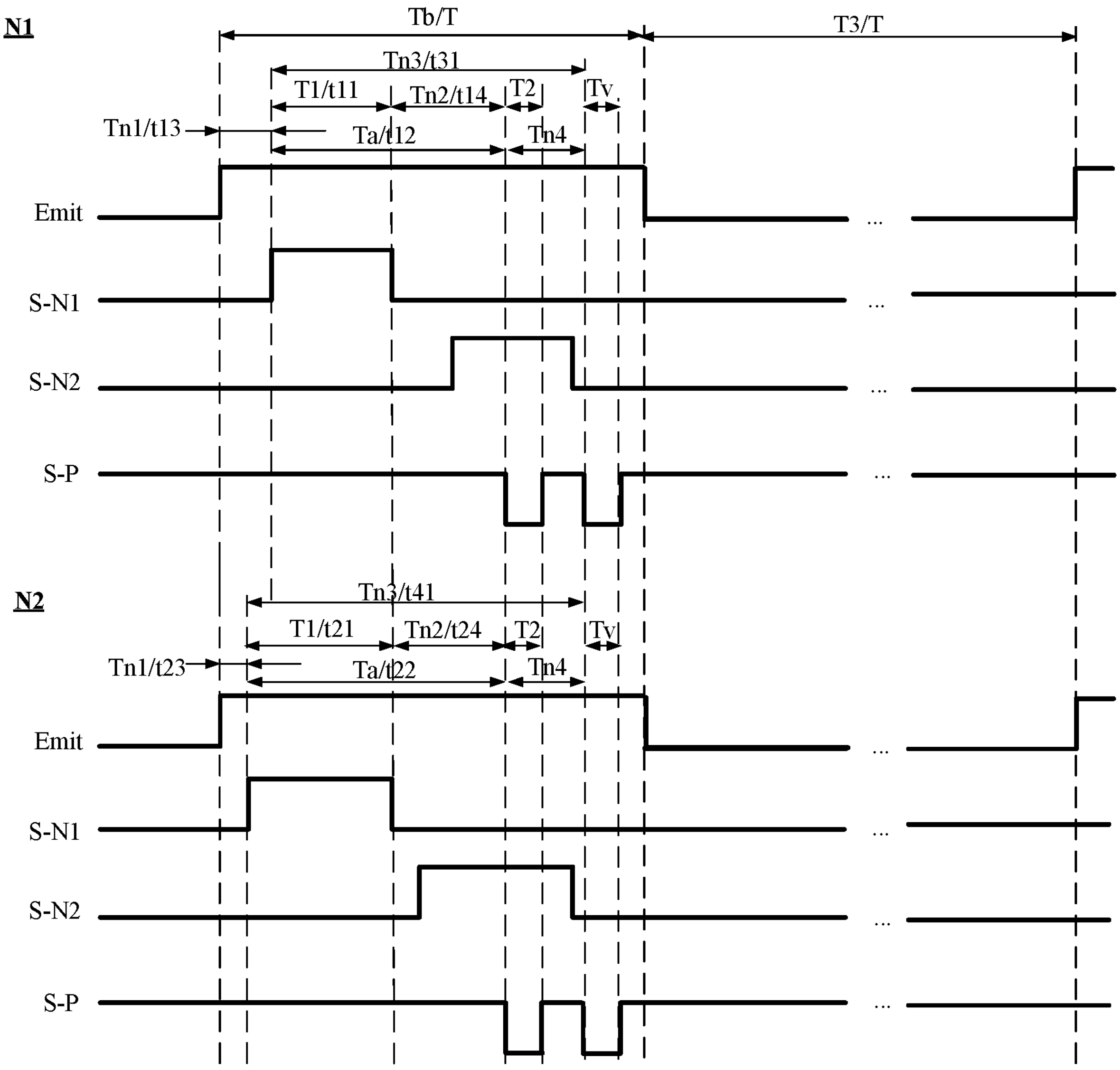
FIG. 12 is a drive timing diagram of a pixel circuit in another display panel according to an embodiment of the present disclosure.
Figure 13:
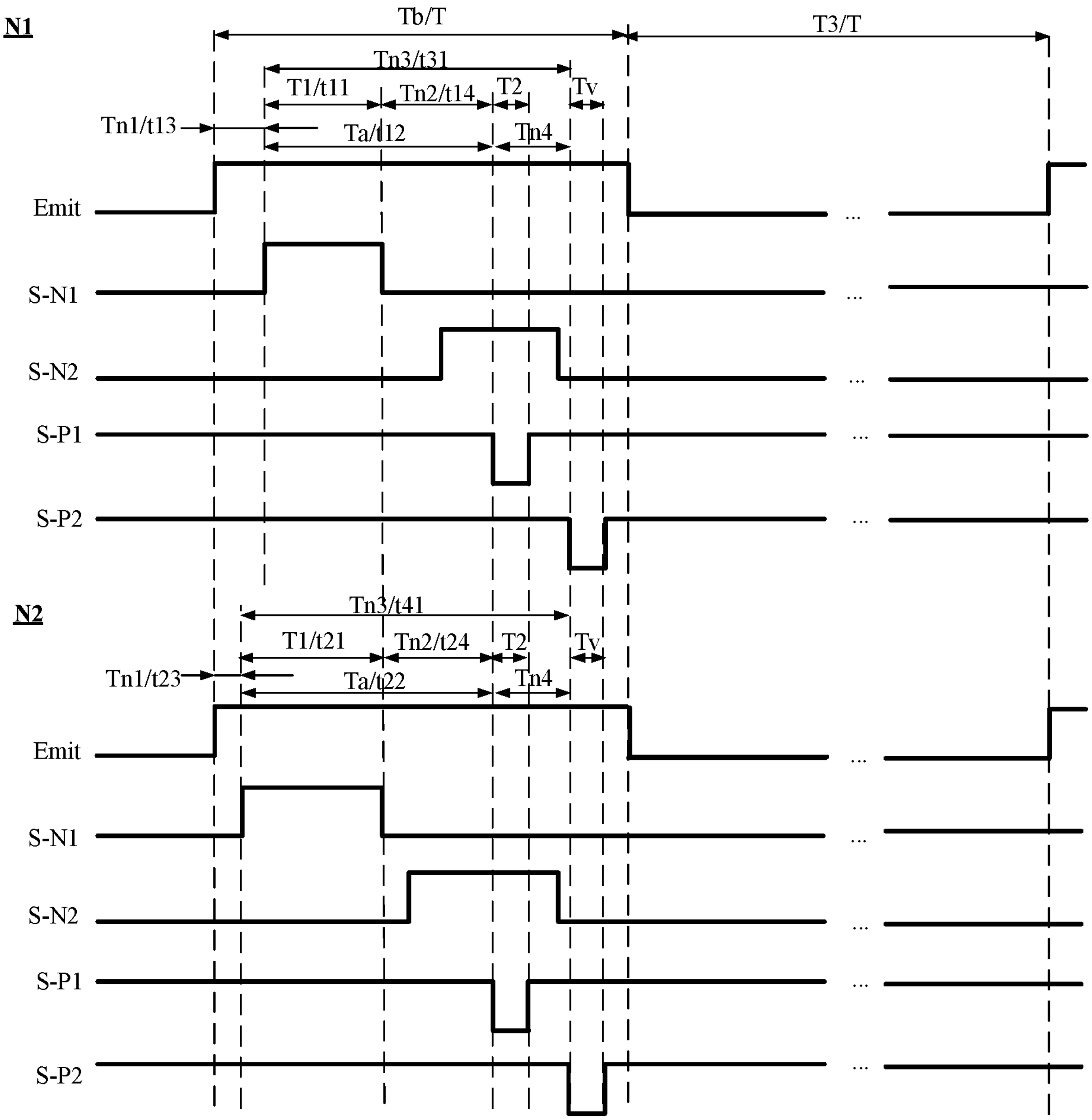
FIG. 13 is a drive timing diagram of a pixel circuit in another display panel according to an embodiment of the present disclosure.

FIG. 12 is a drive timing diagram of a pixel circuit in another display panel according to an embodiment of the present disclosure. FIG. 13 is a drive timing diagram of a pixel circuit in another display panel according to an embodiment of the present disclosure. With reference to FIGS. 2 and 12, or FIGS. 10 and 13, when the data writing frame T includes the bias phase Tv, the bias phase Tv is between the data writing phase T2 and the light-emitting phase T3 in the same data writing frame T. In the same data writing frame T, a time period between the start time of the initialization phase Ta and the start time of the bias phase Tv is a third time period Tn3; the brightness of the display panel 10 in the first mode N1 is less than the brightness of the display panel 10 in the second mode N2; in the first mode N1, the duration of the third time period Tn3 is t31; in the second mode N2, the duration of the third time period Tn3 is t41; and t31<t41.

In the same data writing frame T, the bias phase Tv is between the data writing phase T2 and the light-emitting phase T3, that is, after outputting the data signal Vdata to the drive transistor M1 in the data writing phase T2, the data writing module 13 inputs the bias signal Vobs to the drive transistor M1 in the bias phase Tv. Thus, after the bias phase Tv, the voltage difference between the gate of the drive transistor M1 and the source and/or drain of the drive transistor M1 is (Vdata−Vobs). When the same data writing frame T also includes the third time period Tn3 which is a period between the start time of the initialization phase Ta and the start time of the bias phase Tv, the duration of the third time period Tn3 may reflect the total duration of writing the initialization signal Vref1 and the data signal Vdata before the bias phase Tv is entered.

In an embodiment, the duration of the third time period Tn3 in the second mode with higher brightness is greater than the duration of the third time period Tn3 in the first mode with lower brightness so that the sum of the time for adjusting the bias of the gate of the drive transistor M1 with the initialization signal Vref1 and the time for adjusting the bias of the drive transistor M1 with the data signal Vdata is longer in the second mode with higher brightness. Thus, the bias caused by a relatively small voltage of the written data signal Vdata can be canceled or improved. Similarly, the sum of the time for adjusting the bias of the gate of the drive transistor M1 with the initialization signal Vref1 and the time for adjusting the bias of the drive transistor M1 with the data signal Vdata is shorter in the first mode with higher brightness so that the bias caused by a relatively large voltage of the written data signal Vdata can be canceled or improved. In this manner, the balance of the overall bias adjustment in different modes is ensured, and then the display uniformity of the display panel in different modes is ensured.

With continued reference to FIGS. 2 and 12 or FIGS. 10 and 13, in the same data writing frame T, a time period between the start time of the data writing phase T2 and the start time of the bias phase Tv is a fourth time period Tn4, and the duration of the fourth time period Tn4 in the first mode N1 is the same as the duration of the fourth time period Tn4 in the second mode N2.

When the data writing frame T includes the fourth time period Tn4 that is the time period between the start time of the data writing phase T2 and the start time of the bias phase Tv, the duration of the fourth time period Tn4 may be configured to be the same in different modes, that is, the duration of the fourth time period Tn4 is the same in the first mode N1 and the second mode N2. Therefore, when the scan signal S-P (or the first scan signal S-P1 and the second scan signal S-P2) is used for controlling the data writing module 13 to be turned on in the data writing phase T2 and the bias phase Tv separately, the time interval between the effective pulse corresponding to the data writing phase T2 and the effective pulse corresponding to the bias phase Tv in the scan signal S-P (or the first scan signal S-P1 and the second scan signal S-P2) does not need to be changed as the mode switching. That is, the output of the scan signal S-P (or the first scan signal S-P1 and the second scan signal S-P2) does not have to be changed so that the drive manner of the display panel can be simplified. Moreover, the calculation capability of the drive chip for controlling the output of the scan signal S-P (or the first scan signal S-P1 and the second scan signal S-P2) can be reduced, which facilitates the low cost of the display panel.

Figure 14:
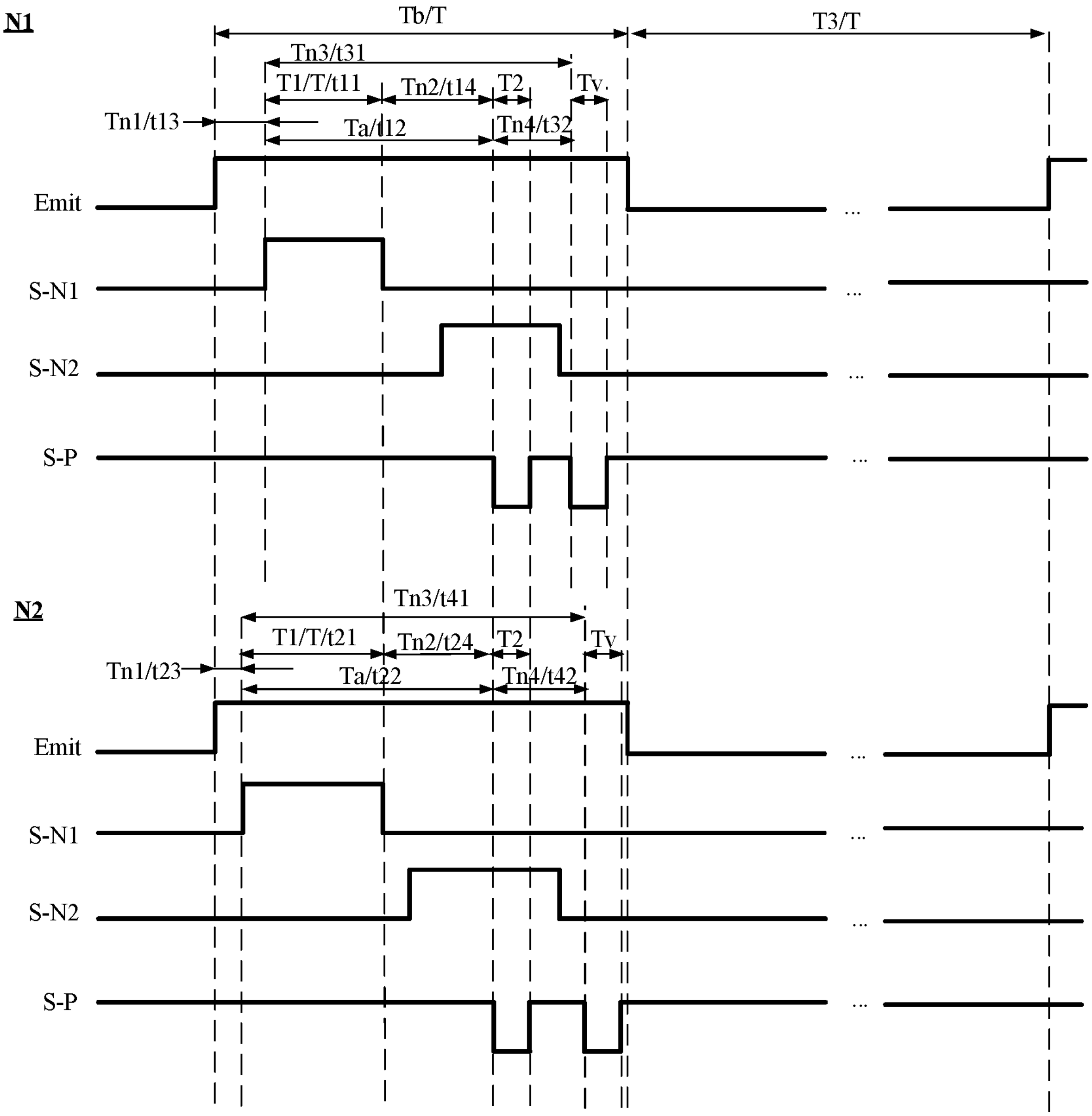
FIG. 14 is a drive timing diagram of a pixel circuit in another display panel according to an embodiment of the present disclosure.
Figure 15:
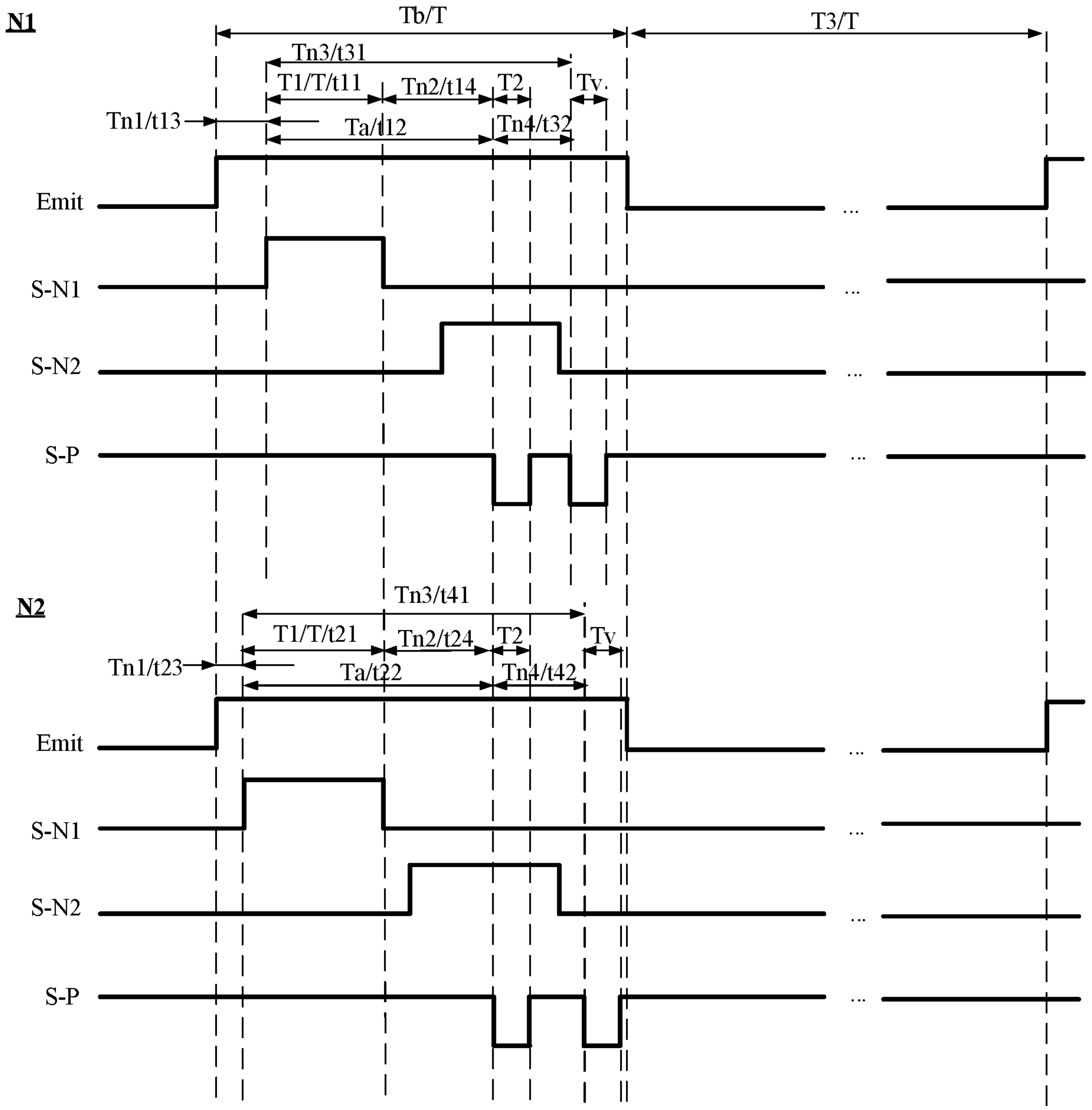
FIG. 15 is a drive timing diagram of a pixel circuit in another display panel according to an embodiment of the present disclosure.

Alternatively, FIG. 14 is a drive timing diagram of a pixel circuit in another display panel according to an embodiment of the present disclosure. FIG. 15 is a drive timing diagram of a pixel circuit in another display panel according to an embodiment of the present disclosure. With reference to FIGS. 2 and 14 or FIGS. 10 and 15, in the same data writing frame T, a time period between the start time of the data writing phase T2 and the start time of the bias phase Tv is a fourth time period Tn4; the brightness of the display panel 10 in the first mode N1 is less than the brightness of the display panel 10 in the second mode N2; in the first mode N1, the duration of the fourth time period Tn4 is t32; in the second mode N2, the duration of the fourth time period Tn4 is t42; and t32<t42.

The fourth time period Tn4 refers to a time period between the start time of the data writing phase T2 and the start time of the bias phase Tv, that is, the gate of the drive transistor M1 remains the data signal Vdata, and the signal Vs/d of the source and the drain of the drive transistor M1 may be the same as the initialization signal Vref1 or may be the same as the signal written in the light-emitting phase T of the previous display screen frame. In this case, when the brightness of the display panel in the first mode is less than the brightness of the display panel in the second mode, the voltage V1 of the data signal Vdata in the first mode N1 is greater than the voltage V2 of the data signal Vdata in the second mode N2 so that the voltage difference between the gate of the drive transistor M1 and the source/drain of the drive transistor M1 in the first mode N1 is (V1−Vs/d), and the voltage difference between the gate of the drive transistor M1 and the source/drain of the drive transistor M1 in the fourth time period Tn4 in the second mode N2 is (V2−Vs/d), and (V1−Vs/d) is greater than (V2−Vs/d). At this time, although the drive transistor M1 is initialized to different degrees with respect to the data signal written into drive transistor M1 by the configuration of the duration of the initialization phase Ta and/or the duration of the initialization writing phase T1, the configuration of the duration of the initialization phase Ta and/or the duration of the initialization writing phase T1 is limited. In this manner, the duration of the fourth time period Tn4 in the first mode N1 with lower brightness is less than the duration of the fourth time period Tn4 in the second mode N2 with higher brightness so that the influence on the bias caused by different data signals Vdata written into the gate of the drive transistor M1 can be better balanced to ensure the display balance of the display panel 10.

Figure 16:
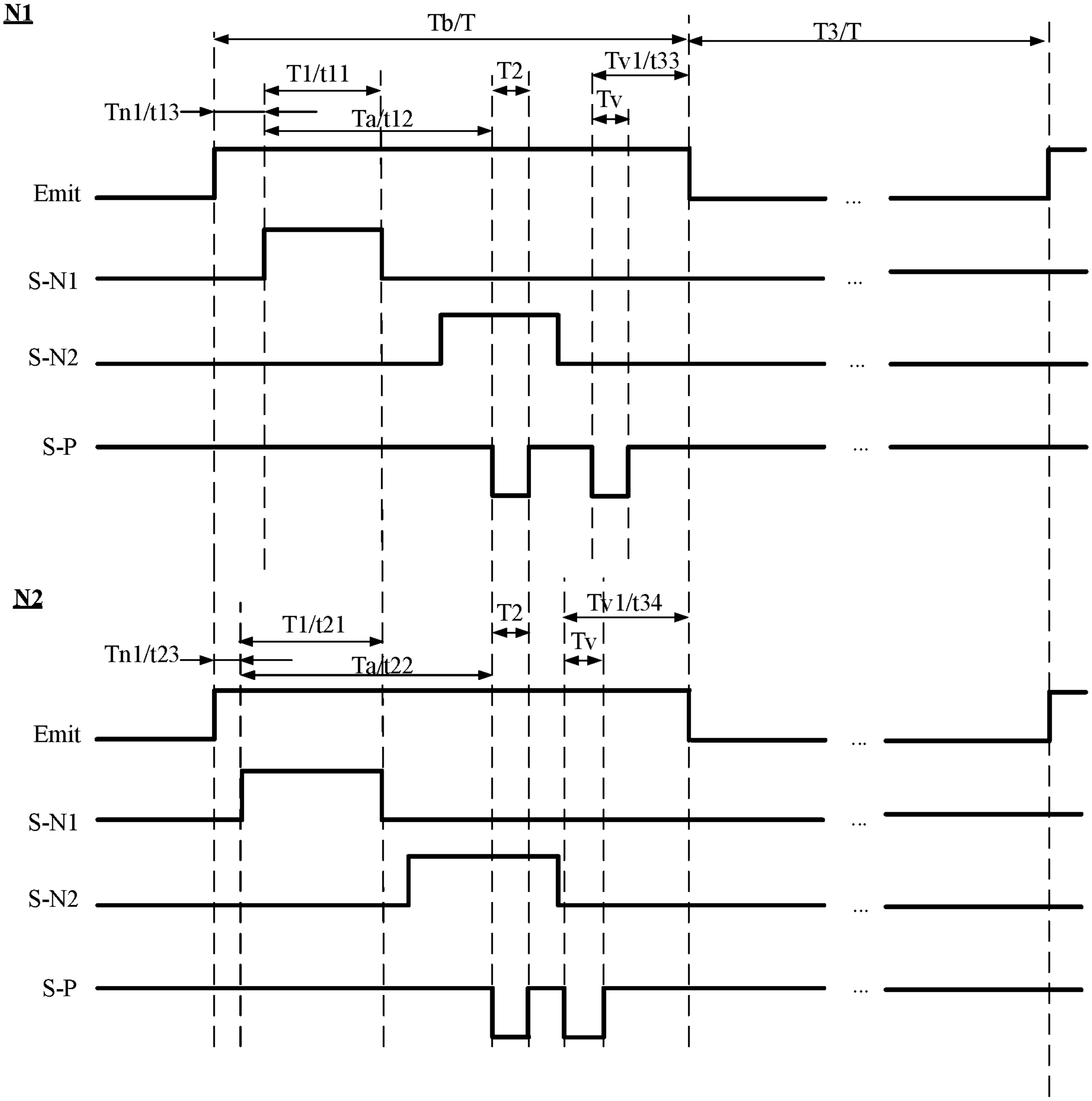
FIG. 16 is a drive timing diagram of a pixel circuit in another display panel according to an embodiment of the present disclosure.
Figure 17:
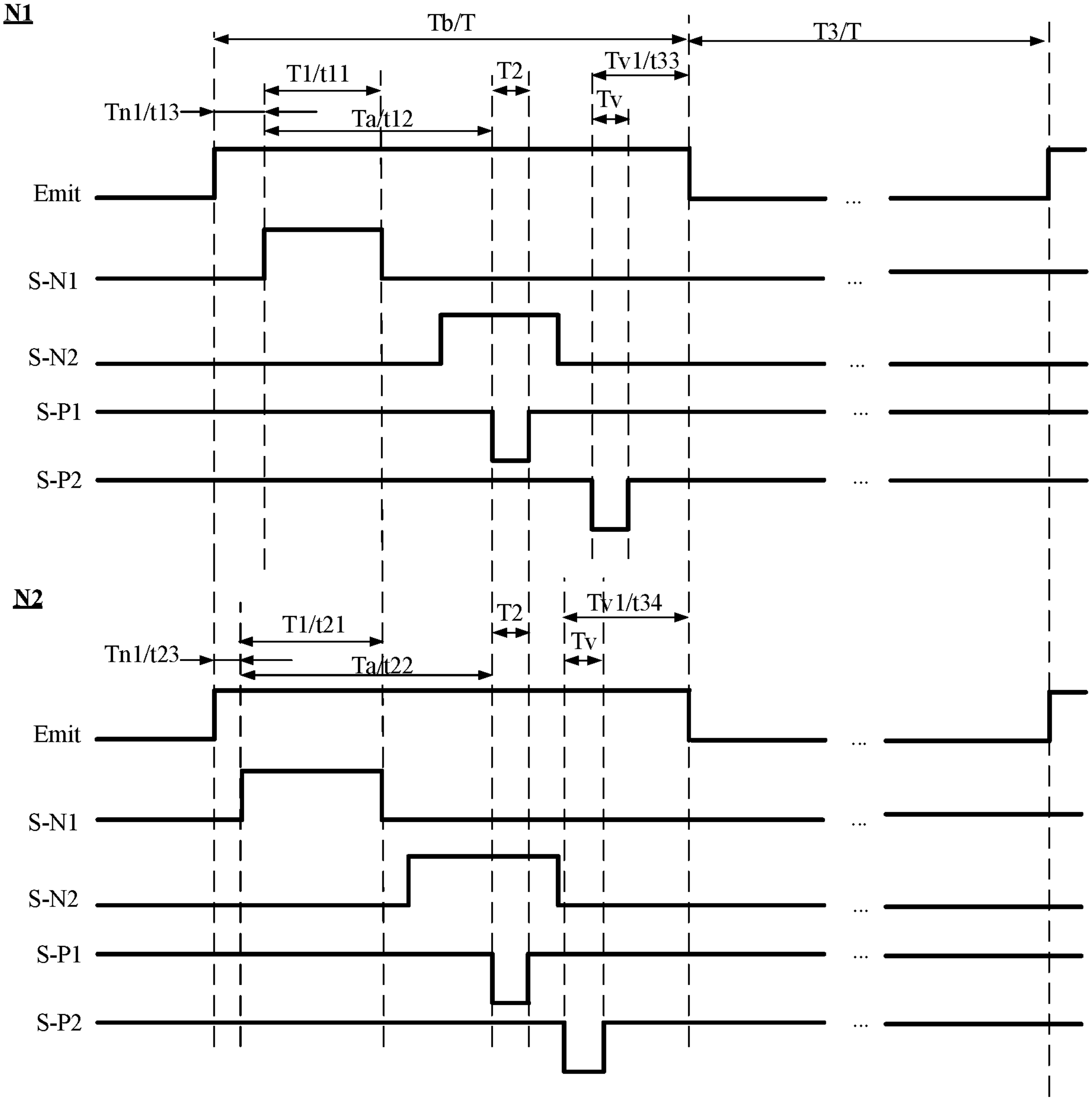
FIG. 17 is a drive timing diagram of a pixel circuit in another display panel according to an embodiment of the present disclosure.

FIG. 16 is a drive timing diagram of a pixel circuit in another display panel according to an embodiment of the present disclosure. FIG. 17 is a drive timing diagram of a pixel circuit in another display panel according to an embodiment of the present disclosure. With reference to FIGS. 2 and 16 or FIGS. 10 and 17, in the same data writing frame T, a time period between the start time of the bias phase Tv and the start time of the light-emitting phase T3 is a first bias maintenance phase Tv1; the brightness of the display panel 10 in the first mode N1 is less than the brightness of the display panel 10 in the second mode N2; in the first mode N1, the duration of the first bias maintenance phase Tv1 is t33; in the second mode N2, the duration of the first bias maintenance phase Tv1 is t43; and t3<t43.

The data writing frame T includes a first bias maintenance phase Tv1 which is a time period between the start time of the bias phase Tv and the start time of the light-emitting phase T3. The source and/or drain of the drive transistor M1 may also be supplied with a bias adjustment signal in the first bias maintenance phase Tv1 so that the voltage of the source and/or drain of the drive transistor M1 is kept consistent with the bias adjustment signal, and the voltage difference between the gate of the drive transistor M1 and the source and/or drain of the drive transistor M1 becomes consistent with the difference between the data signal and the bias adjustment signal. Thus, the bias state of the drive transistor M1 can be adjusted, thereby improving the display uniformity of the display panel and ensuring the display effect of the display panel.

For different brightness modes of the display panel, namely, the first mode N1 and the second mode N2, the data signals Vdata written into the data writing phase T2 are different. In this case, the bias condition of the transistor brought by the voltages of different data signals Vdata in the display panel is balanced in a manner where the duration of the first bias maintenance phase Tv1 in the first mode N1 is configured to be less than the duration of the first bias maintenance phase Tv1 in the second mode N2, that is, the time for adjusting the bias in the second mode N2 is increased, in other words, the time for the voltage difference between the gate and the source of the drive transistor M1 in the second mode N2 to be maintained as the difference between the data signal Vdata and the bias signal Vobs is increased, and the time for adjusting the bias in the first mode N1 is relatively shortened, that is, the time for the voltage difference between the gate and the source of the drive transistor M1 in the first mode N1 to be maintained as the difference between the data signal Vdata and the bias signal Vobs is shortened. In other words, differentiating the first bias maintenance phase Tv1 can ensure that the bias degree of the drive transistor M1 in the first mode N1 is consistent with the bias degree of the drive transistor M1 in the second mode N2 so as to balance different bias conditions caused by different data signals in the two modes, thereby achieving targeted adjustment of the bias state of the drive transistor M1 in different operation modes and facilitating the display uniformity of the display panel in different operation modes.

Figure 18:
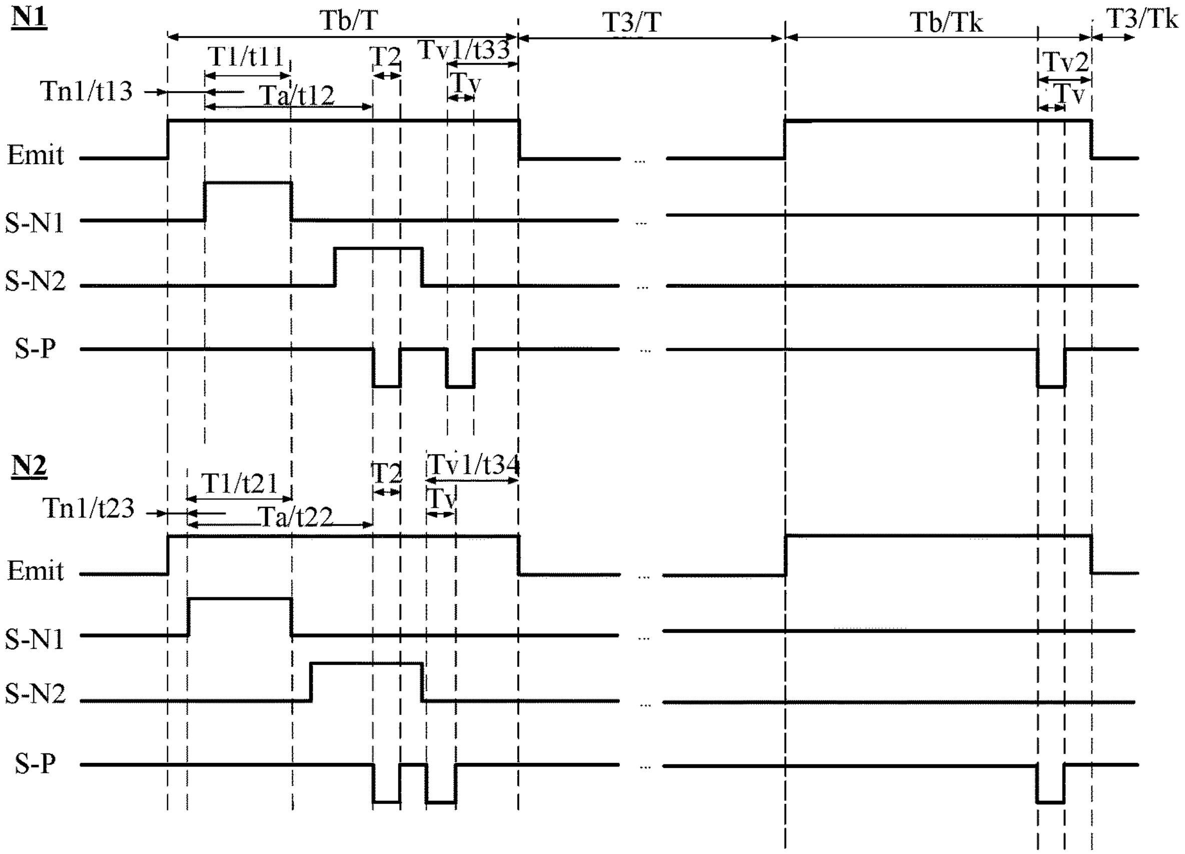
FIG. 18 is a drive timing diagram of a pixel circuit in another display panel according to an embodiment of the present disclosure.
Figure 19:
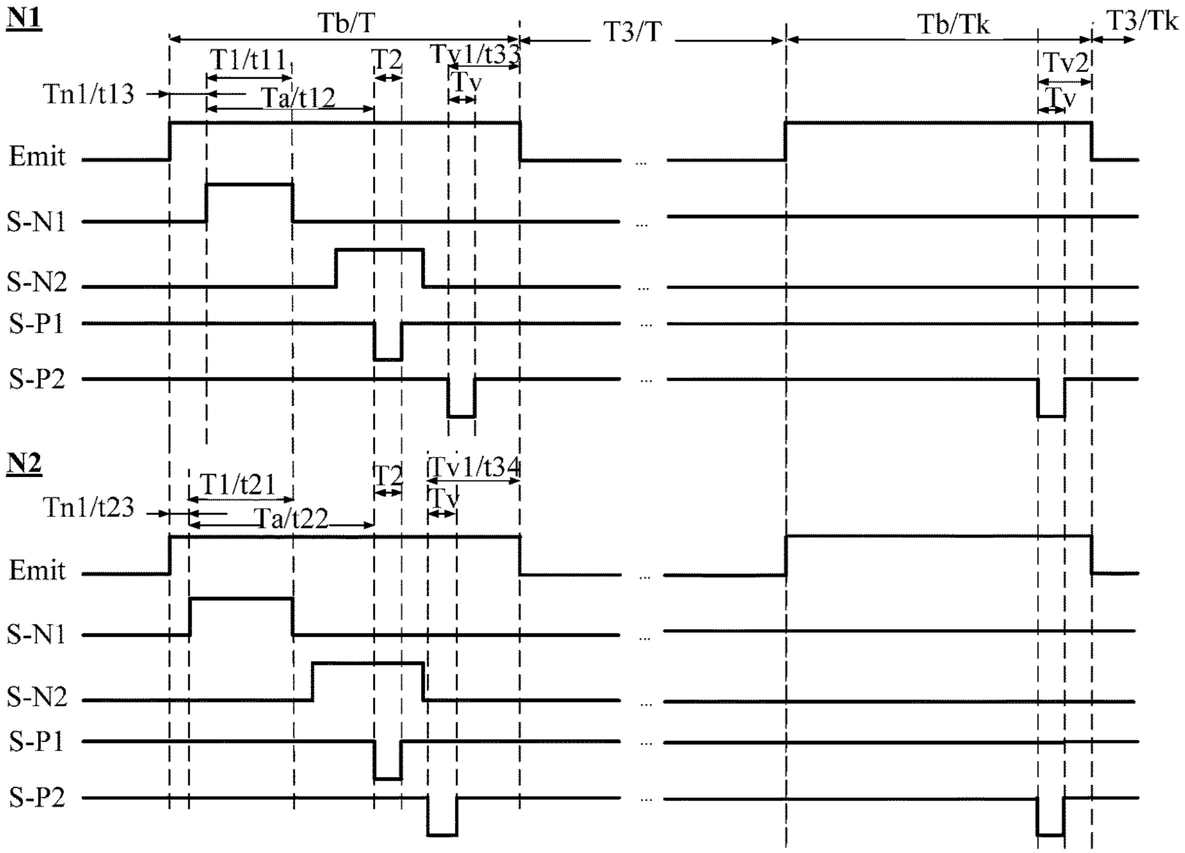
FIG. 19 is a drive timing diagram of a pixel circuit in another display panel according to an embodiment of the present disclosure.

FIG. 18 is a drive timing diagram of a pixel circuit in another display panel according to an embodiment of the present disclosure. FIG. 19 is a drive timing diagram of a pixel circuit in another display panel according to an embodiment of the present disclosure. With reference to FIGS. 2 and 18 or FIGS. 10 and 19, the time of one screen frame of the display panel 10 also includes at least one hold frame Tk; the hold frame Tk includes the bias phase Tv and the light-emitting phase T3; in the hold frame Tk, a time period between the start time of the bias phase Tv and the start time of the light-emitting phase T3 is a second bias maintenance phase Tv2; and the duration of the second bias maintenance phase Tv2 in the first mode N1 is the same as the duration of the second bias maintenance phase Tv2 in the second mode N2.

Generally, the display panel 10 has a hold frame Tk at low or intermediate frequencies. The second bias maintenance phase Tv2 in the hold frame Tk is a time period between the start time of the bias phase Tv and the start time of the light-emitting phase T3. The second bias maintenance phase Tv2 is configured in the hold frame Tk so that the voltage difference between the gate of the drive transistor M1 and the source/drain of the drive transistor M1 is kept as the voltage difference between the data signal Vdata and the bias signal Vobs in the second bias maintenance phase Tv2, different from a situation where the voltage difference between the gate of the drive transistor M1 and the source/drain of the drive transistor M1 is kept as the voltage difference between the data signal Vdata and the positive power signal PVDD in the light-emitting phase T3. Thus, the bias of the drive transistor M1 generated in the light-emitting phase T3 can be adjusted.

In different display modes of the display panel 10, that is, in the first mode N1 and the second mode N2, the duration of the second bias maintenance phase Tv2 may be the same or different and may be configured according to practical requirements. When the duration of the second bias maintenance phase Tv2 in the first mode N1 is the same as the duration of the second bias maintenance phase Tv2 in the second mode N2, the duration of the scan signal S-P (or the first scan signal S-P1 and the second scan signal S-P2) for controlling the data writing module 13 to be turned on or off and the start time of the light-emitting phase T3 do not need to be changed as the mode switching. In this manner, the drive capability of the drive chip that controls the output of the scan signal S-P is reduced, which helps reduce the cost of the display panel.

In an alternative embodiment, with continued reference to FIGS. 2 and 18 or FIGS. 10 and 19, the voltage of the bias signal Vobs provided in the bias phase T of the hold frame Tk in the first mode N1 is V12; the voltage of the bias signal Vobs provided in the bias phase T of the hold frame Tk in the second mode N2 is V22; and V12=V22.

The voltage of the bias signal Vobs provided in the bias phase T of the hold frame Tk in the first mode N1 is the same as the voltage of the bias signal Vobs provided in the bias phase T of the hold frame Tk in the second mode N2, that is, the bias signal Vobs may be the same; in other words, the whole may be adjusted with the same bias signal Vobs so that the bias signal Vobs does not need to be changed with the mode switching, and power consumption caused by switching of the bias signal Vobs is prevented, thereby facilitating low power consumption of the display panel.

Figure 20:
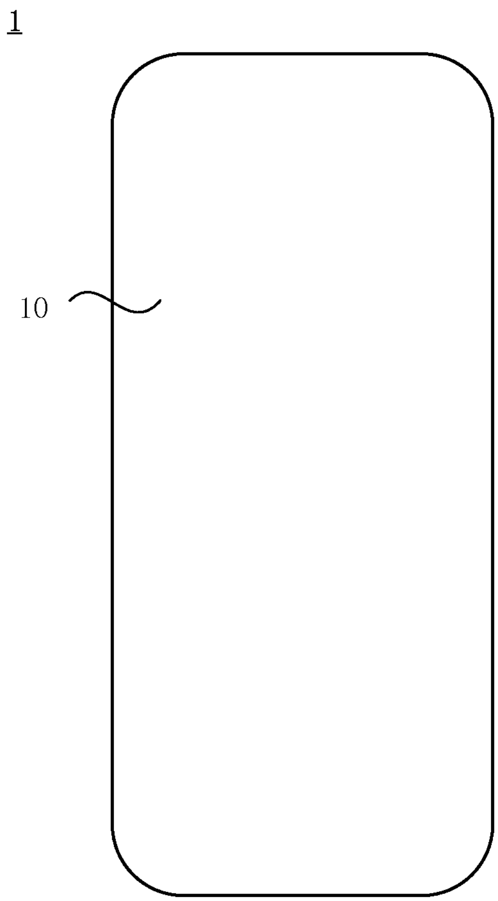
FIG. 20 is a diagram illustrating the structure of a display device according to an embodiment of the present disclosure.

Based on the same inventive concept, an embodiment of the present disclosure also provides a display device. FIG. 20 is a diagram illustrating the structure of a display device according to an embodiment of the present disclosure. The display device includes any one of the display panels provided in the preceding embodiments. Illustratively, with reference to FIG. 20, the display device 1 includes the display panel 10. Therefore, the display device also has the beneficial effects of the display panel described in the preceding embodiments. For the same details, reference may be made to the description of the preceding display panel, and repetition is not made herein.

The display device 1 provided in the embodiments of the present disclosure may be a phone shown in FIG. 20 or may be any electronic product with a display function, including but not limited to, a television, a laptop, a desktop display, a tablet computer, a digital camera, a smart bracelet, smart glasses, an in-vehicle display, industry-controlling equipment, a medical display, and a touch interactive terminal, which is not limited in the embodiments of the present disclosure.

It is to be noted that the preceding are only alternative embodiments of the present disclosure and the technical principles used therein. It is to be understood by those skilled in the art that the present disclosure is not limited to the embodiments described herein. For those skilled in the art, various apparent modifications, adaptations, and substitutions may be made without departing from the scope of the present disclosure. Therefore, while the present disclosure is described in detail via the preceding embodiments, the present disclosure is not limited to the preceding embodiments and may include more equivalent embodiments without departing from the concept of the present disclosure. The scope of the present disclosure is determined by the scope of the appended claims.

What is claimed is:

1. A display panel, comprising a pixel circuit and a light-emitting element, wherein the pixel circuit comprises a drive module, an initialization module, and a data writing module, wherein the drive module comprises a drive transistor, the drive module is configured to selectively provide a drive current for the light-emitting element;

an operation process of the pixel circuit comprises a data writing phase and an initialization writing phase, wherein in the data writing phase, the data writing module provides a data signal; in the initialization writing phase, the initialization module provides an initialization signal;

a time of one screen frame of the display panel at least comprises a data writing frame, wherein the data writing frame comprises the initialization writing phase, the data writing phase, and a light-emitting phase;

in a same data writing frame, a time period between start time of the initialization writing phase and start time of the data writing phase is an initialization phase;

a display mode of the display panel comprises a first mode and a second mode, wherein display brightness of the display panel in the first mode is less than display brightness of the display panel in the second mode; and duration of the initialization phase in the first mode is different from the duration of the initialization phase in the second mode, and/or duration of the initialization writing phase in the first mode is different from the duration of the initialization writing phase in the second mode.

2. The display panel of claim 1, wherein in the first mode, the duration of the initialization writing phase is t11, and the duration of the initialization phase is t12; and in the second mode, the duration of the initialization writing phase is t21, and the duration of the initialization phase is t22; wherein at least one of the following is satisfied: t21>t11, or t22>t12.

3. The display panel of claim 2, wherein the data writing frame comprises a non-light-emitting phase, and the non-light-emitting phase comprises the data writing phase and the initialization writing phase;

in a same non-light-emitting phase, a time period between start time of the non-light-emitting phase and the start time of the initialization writing phase is a first time period; and duration of the first time period in the first mode is t13, and the duration of the first time period in the second mode is t23; wherein t23<t13.

4. The display panel of claim 3, wherein in the same data writing frame, a time period between end time of the initialization writing phase and the start time of the data writing phase is a second time period; and duration of the second time period in the first mode is t14, and the duration of the second time period in the second mode is t24; wherein when t21>t11 and t22>t12, t24<t14.

5. The display panel of claim 3, wherein in the same data writing frame, a time period between end time of the initialization writing phase and the start time of the data writing phase is a second time period; and duration of the second time period in the first mode is t14, and the duration of the second time period in the second mode is t24; wherein when t21>t11 and t22>t12, t24=t14.

6. The display panel of claim 1, wherein in the first mode, the duration of the initialization writing phase is t11, and the duration of the initialization phase is t12; in the second mode, the duration of the initialization writing phase is t21, and the duration of the initialization phase is t22; wherein t21>t11, and t22=t12.

7. The display panel of claim 6, wherein the data writing frame comprises a non-light-emitting phase, and the non-light-emitting phase comprises the data writing phase and the initialization writing phase;

in a same non-light-emitting phase, a time period between start time of the non-light-emitting phase and the start time of the initialization writing phase is a first time period; and duration of the first time period in the first mode is t13, and the duration of the first time period in the second mode is t23; wherein t23=t13.

8. The display panel of claim 1, wherein the operation process of the pixel circuit further comprises a bias phase, and in the bias phase, the data writing module provides a bias signal.

9. The display panel of claim 8, wherein the data writing frame comprises the bias phase; in the same data wiring frame, the bias phase is between the data writing phase and the light-emitting phase;

in the same data wiring frame, a time period between start time of the initialization phase and start time of the bias phase is a third time period;

and duration of the third time period in the first mode is t31, and the duration of the third time period in the second mode is t41; wherein t31<t41.

10. The display panel of claim 9, wherein in the same data wiring frame, a time period between the start time of the data writing phase and the start time of the bias phase is a fourth time period; and duration of the fourth time period in the first mode is the same as the duration of the fourth time period in the second mode.

11. The display panel of claim 9, wherein in the same data wiring frame, a time period between the start time of the data writing phase and the start time of the bias phase is a fourth time period;

and duration of the fourth time period in the first mode is t32, and the duration of the fourth time period in the second mode is t42; wherein t32<t42.

12. The display panel of claim 9, wherein in the same data writing frame, a time period between the start time of the bias phase and start time of the light-emitting phase is a first bias maintenance phase;

and duration of the first bias maintenance phase in the first mode is t33, and the duration of the first bias maintenance phase in the second mode is t43; wherein t33<t43.

13. The display panel of claim 8, wherein the time of one screen frame of the display panel further comprises at least one hold frame; one hold frame of the at least one hold frame comprises the bias phase and the light-emitting phase; in the one hold frame, a time period between start time of the bias phase and start time of the light-emitting phase is a second bias maintenance phase; and duration of the second bias maintenance phase in the first mode is the same as the duration of the second bias maintenance phase in the second mode.

14. The display panel of claim 13, wherein a voltage of the bias signal provided in the bias phase of the one hold frame in the first mode is V12; and the voltage of the bias signal provided in the bias phase of the hold frame in the second mode is V12; wherein V12=V22.

15. The display panel of claim 8, wherein the data writing module comprises a first transistor and a second transistor;

a gate of the first transistor receives a first scan signal, a first electrode of the first transistor receives the data signal, and a second electrode of the first transistor is electrically connected to the drive module; in the data writing phase, the first scan signal controls the first transistor to be turned on; and a gate of the second transistor receives a second scan signal, a first electrode of the second transistor receives the bias signal, and a second electrode of the second transistor is electrically connected to the drive module; in the bias phase, the second scan signal controls the second transistor to be turned on.

16. The display panel of claim 15, wherein a voltage of the bias signal in the first mode is V11, and the voltage of the bias signal in the second mode is V21;

wherein V11=V21.

17. The display panel of claim 1, wherein in the same data writing frame, a time period between the start time of the data writing phase and start time of the light-emitting phase is a data maintenance phase; and duration of the data maintenance phase in the first mode is the same as the duration of the data maintenance phase in the second mode.

18. The display panel of claim 1, wherein in the same data writing frame, a time period between the start time of the data writing phase and start time of the light-emitting phase is a data maintenance phase; and duration of the data maintenance phase in the first mode is different from the duration of the data maintenance phase in the second mode.

19. A display device, comprising a display panel, wherein the display panel comprises a pixel circuit and a light-emitting element, wherein the pixel circuit comprises a drive module, an initialization module, and a data writing module, wherein the drive module comprises a drive transistor, the drive module is configured to selectively provide a drive current for the light-emitting element;

an operation process of the pixel circuit comprises a data writing phase and an initialization writing phase, wherein in the data writing phase, the data writing module provides a data signal; in the initialization writing phase, the initialization module provides an initialization signal;

a time of one screen frame of the display panel at least comprises a data writing frame, wherein the data writing frame comprises the initialization writing phase, the data writing phase, and a light-emitting phase;

in a same data writing frame, a time period between start time of the initialization writing phase and start time of the data writing phase is an initialization phase;

a display mode of the display panel comprises a first mode and a second mode, wherein display brightness of the display panel in the first mode is less than display brightness of the display panel in the second mode; and duration of the initialization phase in the first mode is different from the duration of the initialization phase in the second mode, and/or duration of the initialization writing phase in the first mode is different from the duration of the initialization writing phase in the second mode.

20. The display device of claim 19, wherein in the first mode, the duration of the initialization writing phase is t11, and the duration of the initialization phase is t12; and in the second mode, the duration of the initialization writing phase is t21, and the duration of the initialization phase is t22; wherein at least one of the following is satisfied: t21>t11, or t22>t12.

* * * * *